(12) United States Patent
Bauchart et al.

(10) Patent No.: US 12,557,241 B2
(45) Date of Patent: Feb. 17, 2026

(54) IMMERSION TANK STORAGE SYSTEM FOR A DATA CENTER

(71) Applicant: OVH, Roubaix (FR)

(72) Inventors: Gregory Francis Louis Bauchart, Wattrelos (FR); Ali Chehade, Moncheaux (FR); Alexandre Alain Jean-Pierre Meneboo, Harnes (FR)

(73) Assignee: OVH, Roubaix (FR)

(*) Notice: Subject to any disclaimer, the term of this patent is extended or adjusted under 35 U.S.C. 154(b) by 328 days.

(21) Appl. No.: 18/373,543

(22) Filed: Sep. 27, 2023

(65) Prior Publication Data
US 2024/0023274 A1    Jan. 18, 2024

Related U.S. Application Data

(63) Continuation of application No. PCT/IB2022/052330, filed on Mar. 15, 2022.

(30) Foreign Application Priority Data

Apr. 1, 2021   (EP) ..................................... 21305427

(51) Int. Cl.
| | |
|---|---|
| *G06F 1/20* | (2006.01) |
| *H01L 23/44* | (2006.01) |
| *H05K 7/20* | (2006.01) |

(52) U.S. Cl.
CPC ......... *H05K 7/20236* (2013.01); *H01L 23/44* (2013.01); *G06F 1/20* (2013.01); *H05K 7/20781* (2013.01)

(58) Field of Classification Search
CPC ......... G06F 1/20; G06F 1/206; H05K 7/1401; H05K 7/1485; H05K 7/20236;

(Continued)

(56) References Cited

U.S. PATENT DOCUMENTS

| | | | |
|---|---|---|---|
| 2,115,501 A | 4/1938 | Sergius | |
| 2,316,296 A | 4/1943 | Simonds | |

(Continued)

FOREIGN PATENT DOCUMENTS

| | | |
|---|---|---|
| CN | 201898432 U | 7/2011 |
| CN | 103687443 A | 3/2014 |

(Continued)

OTHER PUBLICATIONS

International Search Report and Written Opinion with regard to PCTIB2022053071 mailed Jun. 28, 2022.

(Continued)

*Primary Examiner* — Abhishek M Rathod
(74) *Attorney, Agent, or Firm* — BCF LLP

(57) ABSTRACT

An immersion tank storage system for a data center, includes: a frame defining a plurality of storage levels disposed above one another; a plurality of immersion tanks supported by the frame, each immersion tank configured to contain electronic devices and an immersion cooling liquid for cooling thereof, each storage level being configured to house first and second immersion tanks; and means for synchronously moving the first and second immersion tanks housed in at least one of the storage levels between: a storage position in which the first and second immersion tanks are spaced from each other by a first distance; and an access position in which the first and second immersion tanks are spaced from each other by a second distance greater than the first distance, wherein in the access position, the first and second immersion tanks are accessible by an operator for accessing the electronic devices contained therein.

15 Claims, 12 Drawing Sheets

(58) Field of Classification Search
CPC .............. H05K 7/203; H05K 7/20327; H05K 7/20681; H05K 7/20772; H05K 7/20781; H05K 7/20809; H05K 7/20818; F28D 20/021; F28D 15/0266

See application file for complete search history.

(56) References Cited

U.S. PATENT DOCUMENTS

| | | |
|---|---|---|
| 3,938,689 A | 2/1976 | De Munnik |
| 4,279,966 A | 7/1981 | Wakana et al. |
| 4,619,316 A | 10/1986 | Nakayama et al. |
| 4,888,664 A | 12/1989 | Rojc |
| 5,268,814 A | 12/1993 | Yakubowski |
| 5,307,956 A | 5/1994 | Richter et al. |
| 5,669,524 A | 9/1997 | Loedel |
| 5,907,473 A | 5/1999 | Przilas et al. |
| 6,023,934 A | 2/2000 | Gold |
| 6,746,388 B2 | 6/2004 | Edwards et al. |
| 6,847,525 B1 | 1/2005 | Smith et al. |
| 6,883,593 B2 | 4/2005 | Johnson et al. |
| 6,899,164 B1 | 5/2005 | Li et al. |
| 6,931,834 B2 | 8/2005 | Jones |
| 7,369,410 B2 | 5/2008 | Chen et al. |
| 7,403,392 B2 | 7/2008 | Attlesey et al. |
| 7,414,845 B2 | 8/2008 | Attlesey et al. |
| 7,472,795 B2 | 1/2009 | Dubon et al. |
| 7,527,085 B2 | 5/2009 | Iijima et al. |
| 7,724,517 B2 | 5/2010 | Attlesey et al. |
| 7,885,070 B2 | 2/2011 | Campbell et al. |
| 7,900,796 B2 | 3/2011 | Ungrady et al. |
| 7,905,106 B2 | 3/2011 | Attlesey |
| 7,911,782 B2 | 3/2011 | Attlesey et al. |
| 7,911,793 B2 | 3/2011 | Attlesey |
| 8,009,419 B2 | 8/2011 | Attlesey et al. |
| 8,014,150 B2 | 9/2011 | Campbell et al. |
| 8,089,764 B2 | 1/2012 | Attlesey |
| 8,089,765 B2 | 1/2012 | Attlesey |
| 8,089,766 B2 | 1/2012 | Attlesey |
| 8,291,964 B2 | 10/2012 | Hwang et al. |
| 8,305,759 B2 | 11/2012 | Attlesey et al. |
| 8,467,189 B2 | 6/2013 | Attlesey |
| 8,619,425 B2 | 12/2013 | Campbell et al. |
| 8,654,529 B2 | 2/2014 | Tufty et al. |
| 8,934,244 B2 | 1/2015 | Shelnutt et al. |
| 8,953,317 B2 | 2/2015 | Campbell et al. |
| 9,049,800 B2 | 6/2015 | Shelnutt et al. |
| 9,051,502 B2 | 6/2015 | Sedarous et al. |
| 9,086,859 B2 | 7/2015 | Tufty et al. |
| 9,128,681 B2 | 9/2015 | Tufty et al. |
| 9,144,179 B2 | 9/2015 | Shelnutt et al. |
| 9,155,230 B2 | 10/2015 | Eriksen |
| 9,176,547 B2 | 11/2015 | Tufty et al. |
| 9,195,282 B2 | 11/2015 | Shelnutt et al. |
| 9,223,360 B2 | 12/2015 | Tufty et al. |
| 9,265,173 B1 * | 2/2016 | Jhang ...................... G06F 1/187 |
| 9,328,964 B2 | 5/2016 | Shelnutt et al. |
| 9,335,802 B2 | 5/2016 | Shelnutt et al. |
| 9,351,429 B2 | 5/2016 | Shelnutt et al. |
| 9,382,914 B1 | 7/2016 | Sharfi |
| 9,426,927 B2 | 8/2016 | Shafer et al. |
| 9,436,235 B2 | 9/2016 | Damaraju et al. |
| 9,464,854 B2 | 10/2016 | Shelnutt et al. |
| 9,529,395 B2 | 12/2016 | Franz et al. |
| 9,699,938 B2 | 7/2017 | Shelnutt et al. |
| 9,699,939 B2 | 7/2017 | Smith |
| 9,717,166 B2 | 7/2017 | Eriksen |
| 9,756,766 B2 | 9/2017 | Best |
| 9,773,526 B2 | 9/2017 | Shelnutt et al. |
| 9,781,859 B1 | 10/2017 | Wishman et al. |
| 9,795,065 B2 | 10/2017 | Shelnutt et al. |
| 9,801,465 B1 * | 10/2017 | Finch, Jr. .............. A47B 46/005 |
| 9,839,164 B2 | 12/2017 | Shelnutt et al. |
| 9,844,166 B2 | 12/2017 | Shelnutt et al. |
| 9,861,194 B1 * | 1/2018 | Park ...................... A47B 67/04 |
| 9,872,561 B1 * | 1/2018 | Alfaro ................. A47B 88/457 |
| 9,921,622 B2 | 3/2018 | Shelnutt et al. |
| 9,968,010 B2 | 5/2018 | Shelnutt et al. |
| 9,992,914 B2 | 6/2018 | Best et al. |
| 10,010,013 B2 | 6/2018 | Shelnutt et al. |
| 10,018,425 B2 | 7/2018 | Shelnutt et al. |
| 10,020,242 B2 | 7/2018 | Katsumata et al. |
| 10,064,314 B2 | 8/2018 | Shelnutt et al. |
| 10,104,808 B2 | 10/2018 | Scharinger et al. |
| 10,130,008 B2 | 11/2018 | Shepard et al. |
| 10,143,113 B2 | 11/2018 | Shelnutt et al. |
| 10,143,114 B2 | 11/2018 | Shelnutt et al. |
| 10,146,231 B2 | 12/2018 | Shelnutt et al. |
| 10,149,408 B2 | 12/2018 | Fujiwara et al. |
| 10,156,873 B2 | 12/2018 | Shelnutt et al. |
| 10,172,262 B2 | 1/2019 | Shelnutt et al. |
| 10,206,312 B2 | 2/2019 | Shelnutt et al. |
| 10,212,857 B2 | 2/2019 | Eriksen |
| 10,225,958 B1 | 3/2019 | Gao |
| 10,238,010 B2 | 3/2019 | Shelnutt et al. |
| 10,271,456 B2 | 4/2019 | Tufty et al. |
| 10,321,609 B2 | 6/2019 | Hirai et al. |
| 10,331,144 B2 | 6/2019 | Shelnutt et al. |
| 10,399,190 B2 | 9/2019 | North et al. |
| 10,542,635 B2 | 1/2020 | Nishiyama |
| 10,598,441 B2 | 3/2020 | Kawabata et al. |
| 10,617,042 B2 | 4/2020 | Shelnutt et al. |
| 10,622,283 B2 | 4/2020 | Leobandung |
| 10,624,236 B2 | 4/2020 | Inano et al. |
| 10,624,242 B2 | 4/2020 | Best |
| 10,638,641 B2 | 4/2020 | Franz et al. |
| 10,645,841 B1 | 5/2020 | Mao et al. |
| 10,653,036 B1 | 5/2020 | Gao |
| 10,667,434 B1 | 5/2020 | Mao et al. |
| 10,674,641 B2 | 6/2020 | Shepard et al. |
| 10,716,238 B2 | 7/2020 | Brink |
| 10,729,039 B2 | 7/2020 | Shelnutt et al. |
| 10,791,647 B1 | 9/2020 | Miyamura et al. |
| 10,809,011 B2 | 10/2020 | Chu et al. |
| 10,871,807 B2 | 12/2020 | Best et al. |
| 10,881,019 B2 | 12/2020 | Fujiwara et al. |
| 10,888,032 B2 | 1/2021 | Wakino et al. |
| 10,917,998 B2 | 2/2021 | Shelnutt et al. |
| 10,932,390 B2 | 2/2021 | Korikawa |
| 10,939,580 B2 | 3/2021 | Gao |
| 10,939,581 B1 | 3/2021 | Chen et al. |
| 10,990,144 B2 | 4/2021 | Wang et al. |
| 11,006,547 B2 | 5/2021 | Gao |
| 11,032,939 B2 | 6/2021 | Tufty et al. |
| 11,071,238 B2 | 7/2021 | Edmunds et al. |
| 11,107,749 B2 | 8/2021 | Taniguchi et al. |
| 11,184,997 B2 | 11/2021 | Broderick et al. |
| 11,268,739 B2 | 3/2022 | Wang et al. |
| 11,572,614 B2 | 2/2023 | Sakamoto et al. |
| 11,751,359 B2 | 9/2023 | Heydari |
| 11,822,398 B2 | 11/2023 | Heydari |
| 11,837,830 B2 | 12/2023 | Crighton et al. |
| 11,882,670 B2 | 1/2024 | Gao |
| 2002/0159233 A1 | 10/2002 | Patel et al. |
| 2004/0244947 A1 | 12/2004 | Chen |
| 2005/0145582 A1 | 7/2005 | Dubon et al. |
| 2005/0150637 A1 | 7/2005 | Tan et al. |
| 2005/0248922 A1 | 11/2005 | Chu et al. |
| 2007/0025081 A1 | 2/2007 | Berlin et al. |
| 2007/0227756 A1 | 10/2007 | Doerr et al. |
| 2009/0146294 A1 | 6/2009 | Hillman et al. |
| 2009/0205590 A1 | 8/2009 | Vetrovec |
| 2009/0260777 A1 | 10/2009 | Attlesey |
| 2010/0103620 A1 | 4/2010 | Campbell et al. |
| 2010/0108292 A1 | 5/2010 | Bhunia et al. |
| 2010/0118494 A1 | 5/2010 | Campbell et al. |
| 2010/0170657 A1 | 7/2010 | Kaslusky |
| 2010/0328889 A1 | 12/2010 | Campbell et al. |
| 2011/0026776 A1 | 2/2011 | Liang et al. |
| 2011/0028617 A1 | 2/2011 | Hill et al. |
| 2011/0267768 A1 | 11/2011 | Attlesey |
| 2011/0284194 A1 | 11/2011 | Sarkar et al. |
| 2011/0286177 A1 | 11/2011 | Attlesey |
| 2011/0317367 A1 | 12/2011 | Campbell et al. |
| 2012/0007579 A1 | 1/2012 | Apblett et al. |

(56) References Cited

U.S. PATENT DOCUMENTS

| | | |
|---|---|---|
| 2012/0014064 A1 | 1/2012 | St Rock et al. |
| 2012/0058588 A1 | 3/2012 | Mayer et al. |
| 2012/0075797 A1 | 3/2012 | Attlesey |
| 2012/0120599 A1 | 5/2012 | Chua et al. |
| 2012/0193068 A1 | 8/2012 | Nemesh et al. |
| 2013/0050963 A1 | 2/2013 | Zhou et al. |
| 2013/0105120 A1 | 5/2013 | Campbell et al. |
| 2013/0312839 A1 | 11/2013 | Shelnutt et al. |
| 2013/0341471 A1 | 12/2013 | Yang et al. |
| 2014/0123492 A1 | 5/2014 | Campbell et al. |
| 2014/0216688 A1 | 8/2014 | Shelnutt et al. |
| 2014/0218845 A1 | 8/2014 | Peng et al. |
| 2014/0218861 A1 | 8/2014 | Shelnutt et al. |
| 2014/0321054 A1 | 10/2014 | Kaefer et al. |
| 2015/0061568 A1 | 3/2015 | Martinez |
| 2015/0109730 A1 | 4/2015 | Campbell et al. |
| 2015/0237767 A1 | 8/2015 | Shedd et al. |
| 2015/0330718 A1 | 11/2015 | St Rock et al. |
| 2016/0021793 A1 | 1/2016 | Chen |
| 2016/0120059 A1 | 4/2016 | Shedd et al. |
| 2016/0305565 A1 | 10/2016 | Miller et al. |
| 2016/0330874 A1 | 11/2016 | Sato et al. |
| 2016/0360637 A1 | 12/2016 | Harvilchuck et al. |
| 2016/0366792 A1 | 12/2016 | Smith |
| 2017/0105313 A1 | 4/2017 | Shedd et al. |
| 2017/0127565 A1 | 5/2017 | Campbell et al. |
| 2017/0181328 A1 | 6/2017 | Shelnutt et al. |
| 2017/0241721 A1 | 8/2017 | Liang |
| 2017/0265328 A1 | 9/2017 | Sasaki et al. |
| 2017/0325358 A1* | 11/2017 | Franz ............... H05K 7/20781 |
| 2018/0008467 A1 | 1/2018 | Cater et al. |
| 2018/0027695 A1 | 1/2018 | Wakino et al. |
| 2018/0042138 A1 | 2/2018 | Campbell et al. |
| 2018/0070477 A1 | 3/2018 | Saito |
| 2018/0084671 A1 | 3/2018 | Matsumoto et al. |
| 2018/0092243 A1 | 3/2018 | Saito |
| 2018/0153058 A1 | 5/2018 | Hirai et al. |
| 2018/0196484 A1 | 7/2018 | Saito |
| 2018/0246550 A1 | 8/2018 | Inaba et al. |
| 2018/0295745 A1 | 10/2018 | De Meijer et al. |
| 2018/0338388 A1 | 11/2018 | We et al. |
| 2019/0014685 A1 | 1/2019 | So et al. |
| 2019/0090383 A1 | 3/2019 | Tufty et al. |
| 2019/0098796 A1 | 3/2019 | Wakino et al. |
| 2019/0218101 A1 | 7/2019 | Huang et al. |
| 2019/0223324 A1 | 7/2019 | Le et al. |
| 2019/0297747 A1 | 9/2019 | Wakino et al. |
| 2020/0025451 A1 | 1/2020 | Stone et al. |
| 2020/0093037 A1 | 3/2020 | Enright et al. |
| 2020/0095667 A1 | 3/2020 | Sakamoto et al. |
| 2020/0150731 A1 | 5/2020 | Wang et al. |
| 2020/0196489 A1 | 6/2020 | Chang et al. |
| 2020/0214169 A1 | 7/2020 | Tsunoda |
| 2020/0267872 A1 | 8/2020 | Harada et al. |
| 2020/0288600 A1 | 9/2020 | Gao |
| 2020/0305307 A1 | 9/2020 | Amos et al. |
| 2020/0323100 A1 | 10/2020 | Chiu et al. |
| 2020/0323108 A1 | 10/2020 | Bilan et al. |
| 2020/0389998 A1 | 12/2020 | Tung et al. |
| 2020/0390007 A1 | 12/2020 | Edmunds et al. |
| 2021/0051815 A1 | 2/2021 | Van et al. |
| 2021/0076531 A1 | 3/2021 | Tung et al. |
| 2021/0102294 A1 | 4/2021 | Miljkovic et al. |
| 2021/0112683 A1 | 4/2021 | Mohajer et al. |
| 2021/0185850 A1 | 6/2021 | Kulkarni et al. |
| 2021/0321526 A1 | 10/2021 | Kulkarni et al. |
| 2021/0327787 A1 | 10/2021 | Yang et al. |
| 2021/0385971 A1 | 12/2021 | Gorius et al. |
| 2021/0410292 A1 | 12/2021 | Yang et al. |
| 2021/0410319 A1 | 12/2021 | Manousakis et al. |
| 2021/0410320 A1 | 12/2021 | Yang et al. |
| 2021/0410328 A1 | 12/2021 | Yang et al. |
| 2022/0256744 A1 | 8/2022 | Le et al. |
| 2023/0059446 A1 | 2/2023 | Gao |
| 2024/0152163 A1 | 5/2024 | Heger et al. |
| 2025/0194044 A1 | 6/2025 | Chehade et al. |

FOREIGN PATENT DOCUMENTS

| | | |
|---|---|---|
| CN | 106681459 A | 5/2017 |
| CN | 107643813 A | 1/2018 |
| CN | 110691490 A | 1/2020 |
| CN | 210630126 U | 5/2020 |
| CN | 211184672 U | 8/2020 |
| CN | 110430725 B | 2/2021 |
| EP | 2321849 A1 | 5/2011 |
| EP | 2331412 B1 | 9/2012 |
| EP | 3236727 A2 | 10/2017 |
| EP | 3249496 A1 | 11/2017 |
| EP | 3236727 A3 | 1/2018 |
| EP | 3346491 A1 | 7/2018 |
| EP | 3402316 A1 | 11/2018 |
| EP | 3731611 A1 | 10/2020 |
| EP | 3742097 A1 | 11/2020 |
| EP | 2321849 B1 | 1/2022 |
| GB | 2575680 A | 1/2020 |
| GB | 2574632 B | 7/2020 |
| JP | H043451 A | 1/1992 |
| JP | 2000092819 A | 3/2000 |
| JP | 2020065002 A | 4/2020 |
| NL | 1006486 C2 | 1/1999 |
| TW | I 678 961 B | 12/2019 |
| WO | 2011006150 A1 | 1/2011 |
| WO | 2012162986 A1 | 12/2012 |
| WO | 2014/169230 A1 | 10/2014 |
| WO | 2016076882 A1 | 5/2016 |
| WO | 2017/040217 A1 | 3/2017 |
| WO | 2018025016 A1 | 2/2018 |
| WO | 2018054462 A1 | 3/2018 |
| WO | 2019006437 A1 | 1/2019 |
| WO | 2019060576 A2 | 3/2019 |
| WO | 2019068916 A2 | 4/2019 |
| WO | 2019068916 A3 | 6/2019 |
| WO | 2020/102090 A1 | 5/2020 |
| WO | 2020170079 A1 | 8/2020 |
| WO | 2020/183038 A1 | 9/2020 |
| WO | 2020216954 A1 | 10/2020 |
| WO | 2020/234600 A1 | 11/2020 |
| WO | 2020223806 A1 | 11/2020 |
| WO | 2020254917 A1 | 12/2020 |
| WO | 2021/040841 A1 | 3/2021 |
| WO | 2021161026 A1 | 8/2021 |

OTHER PUBLICATIONS

International Search Report and Written Opinion with regard to PCT/IB2022/052975 mailed Jun. 20, 2022.

International Search Report and Written Opinion with regard to PCTIB2022052330 mailed May 30, 2022.

International Search Report and Written Opinion with regard to PCT/IB2022/052976 mailed Jun. 17, 2022.

International Search Report and Written Opinion with regard to PCT/IB2022/052977 mailed Jun. 20, 2022.

European Search Report with regard to EP21306170.8 completed Feb. 12, 2022.

European Search Report with regard to EP21306189.8 completed Feb. 10, 2022.

Office Action with regard to te counterpart U.S. Appl. No. 17/690,839 issued Jun. 25, 2024.

Office Action with regard to te counterpart U.S. Appl. No. 17/698,480 issued Jul. 3, 2024.

Office Action with regard to the counterpart U.S. Appl. No. 17/698,037 mailed Feb. 26, 2024.

Office Action with regard to the counterpart U.S. Appl. No. 17/697,616 mailed Feb. 26, 2024.

Notice of Allowance with regard to the counterpart U.S. Appl. No. 17/690,839 mailed Mar. 5, 2024.

Office Action with regard to the counterpart U.S. Appl. No. 17/697,452 issued Sep. 6, 2024.

(56) References Cited

OTHER PUBLICATIONS

Notice of Allowance with regard to te counterpart U.S. Appl. No. 17/697,616 issued Jul. 23, 2024.
Extended European Search Report with regard to the counterpart EP Patent Application No. 22305018.8 completed Jun. 24, 2022.
Office Action with regard to the counterpart U.S. Appl. No. 17/701,422 mailed Mar. 28, 2023.
Notice of Allowance with regard to the counterpart U.S. Appl. No. 17/691,494 mailed Apr. 17, 2023.
Office Action with regard to the counterpart U.S. Appl. No. 17/697,452 mailed May 11, 2023.
Office Action with regard to the counterpart U.S. Appl. No. 17/698,480 mailed Sep. 7, 2023.
Office Action with regard to the counterpart U.S. Appl. No. 17/697,264 mailed Nov. 22, 2023.
Office Action with regard to the counterpart U.S. Appl. No. 17/697,452 mailed Nov. 22, 2023.
Office Action with regard to the counterpart U.S. Appl. No. 17/690,833 mailed Mar. 28, 2024.
Office Action with regard to the counterpart U.S. Appl. No. 17/697,452 mailed Mar. 25, 2024.
Office Action with regard to the counterpart U.S. Appl. No. 18/373,539 issued Jul. 10, 2025.
Office Action with regard to the counterpart U.S. Appl. No. 18/373,567 issued Jul. 18, 2025.
Office Action with regard to te counterpart CN Patent Application No. 2022103326074 issued Jul. 29, 2024.
Office Action with regard to the counterpart CN Patent Application No. 2022103375314 issued Aug. 12, 2024.
Notice of Allowance with regard to the counterpart U.S. Appl. No. 17/707,200 issued Aug. 15, 2024.
Office Action with regard to te counterpart CN Patent Application No. 2022103375051 issued May 11, 2024.
"HP Expands Workstation Series to Include Desk-side, Mobile and Small Form Factor Mode", TechPowerUp, Mar. 24, 2010, https://www.techpowerup.com/118323/hp-expands-workstation-series-to-include-desk-side-mobile-and-small-form-factor-mode, retrieved on Jul. 19, 2021, 6 pages.
"IBM's Hot-Water Supercomputer Goes Live", Data Center Knowledge, retrieved on Jul. 19, 2021, 9 pages.
Extended European Search Report with regard to the EP Patent Application No. 21306771.3 completed May 23, 2022.
Extended European Search Report with regard to the EP Patent Application No. 21306173.2 completed Feb. 18, 2022.
Extended European Search Report with regard to the EP Patent Application No. 21306174.0 completed Feb. 14, 2022.
Extended European Search Report with regard to the EP Patent Application No. 21306172.4 completed Feb. 15, 2022.
English Abstract for JP2020065002 retrieved on Espacenet on Jun. 2, 2022.
Extended European Search Report with regard to the EP Patent Application No. 21306186.4 completed Feb. 10, 2022.
Extended European Search Report with regard to the EP Patent Application No. 21306187.2 completed Feb. 10, 2022.
Extended European Search Report with regard to the EP Patent Application No. 21306175.7 completed Apr. 8, 2022.
Extended European Search Report with regard to the EP Patent Application No. 21306188.0 completed Feb. 10, 2022.
English Abstract for JPH043451 retrieved on Feb. 22, 2022.
Extended European Search Report with regard to the EP Patent Application No. 21306171.6 completed Feb. 11, 2022.
Extended European Search Report with regard to the EP Patent Application No. 21306189.8 completed Feb. 10, 2022.
Extended European Search Report with regard to the EP Patent Application No. 21306170.8 completed Feb. 12, 2022.
English Abstract for NL1006486 retrieved on Espacenet on Jun. 3, 2022.
Office Action with regard to the counterpart CN Patent Application No. 2022103478109 issued Aug. 30, 2024.
Office Action with regard to the counterpart U.S. Appl. No. 18/373,555 issued Jun. 17, 2025.
Office Action with regard to the counterpart U.S. Appl. No. 17/694,765 mailed Dec. 21, 2023.

\* cited by examiner

IMMERSION TANK STORAGE SYSTEM FOR A DATA CENTER

CROSS-REFERENCE

The present application is a continuation of PCT Application No. PCT/IB2022/052330 filed on Mar. 15, 2022, claiming priority to European Patent Application No. 21305427.3 filed on Apr. 1, 2021, the disclosures of which are hereby incorporated by reference in their entireties.

FIELD OF TECHNOLOGY

The present technology relates to data centers and particularly to immersion tank storage systems used therefor.

BACKGROUND

Data centers are dedicated spaces used for housing servers (i.e., computer systems) and other associated electronic equipment. The servers and the associated electronic equipment are continuously operating and therefore discharge a significant amount of heat which the data center is designed to dissipate in order to maintain a suitable operating temperature. Conventionally, data centers have been designed to cool the servers by arranging the servers in rows of racks through which air is circulated to lower their temperature.

More recently an alternative solution has been proposed which implements the use of immersion tanks in which the servers and/or associated equipment are housed and submerged in an immersion cooling liquid, namely a dielectric liquid, that cools the submerged components. However, such immersion tanks are bulky and have a significant associated weight, rendering their storage and displacement problematic.

There is therefore a desire for an immersion tank storage system which can alleviate at least some of these drawbacks.

SUMMARY

It is an object of the present technology to ameliorate at least some of the inconveniences present in the prior art.

According to one aspect of the present technology, there is provided an immersion tank storage system for a data center. The immersion tank storage system comprises: a frame (12) defining a plurality of storage levels (14) disposed above one another; a plurality of immersion tanks (50) supported by the frame (12), each immersion tank (50) being configured to contain electronic devices (70) and an immersion cooling liquid (72) in which the electronic devices are immersed for cooling thereof, each storage level being configured to house first and second immersion tanks of the plurality of immersion tanks; and means for synchronously moving the first and second immersion tanks housed in at least one of the storage levels between: a storage position in which the first and second immersion tanks are spaced from each other by a first distance; and an access position in which the first and second immersion tanks are spaced from each other by a second distance greater than the first distance, wherein in the access position, the first and second immersion tanks are accessible by an operator for accessing the electronic devices contained therein.

In some embodiments, throughout a range of motion between the storage position and the access position, the first and second immersion tanks remain generally symmetrical to each other relative to a fixed vertical plane extending between the first and second immersion tanks.

In some embodiments, the means for synchronously moving the first and second immersion tanks comprises: a first moving platform supporting the first immersion tank housed in the at least one of the storage levels, the first moving platform being movable relative to the frame; and a second moving platform supporting the second immersion tank housed in the at least one of the storage levels, the second moving platform being movable relative to the frame, the first and second moving platforms being operatively connected to each other such that the first and second moving platforms are movable synchronously to translate the first and second immersion tanks between the storage and access positions.

In some embodiments, the means for synchronously moving the first and second immersion tanks comprises: an actuator; and at least one rotary member operatively connected to the actuator and rotatable thereby, wherein rotation of the at least one rotary member by the actuator causes displacement of the first and second immersion tanks between the storage and access positions.

In some embodiments, the actuator is a motor.

In some embodiments, each of the at least one rotary member is a lead screw.

In some embodiments, the at least one rotary member includes two rotary members laterally spaced apart from one another, the two rotary members being operatively connected to the actuator by a flexible link.

In some embodiments, the means for synchronously moving the first and second immersion tanks further comprises: a first moving platform supporting the first immersion tank housed in the at least one of the storage levels; and a second moving platform supporting the second immersion tank housed in the at least one of the storage levels, the first and second moving platforms being operatively connected to each other by the at least one rotary member, the first and second moving platforms being movable synchronously by the at least one rotary member to translate the first and second immersion tanks between the storage and access positions.

In some embodiments, the first and second immersion tanks are offset from one another in a depth direction of the frame; the first and second immersion tanks housed in the at least one of the storage levels are moved along the depth direction from the storage position to the access position; and in the access position, the first and second immersion tanks are disposed, in the depth direction, at least partially outwardly from opposite ends of the frame along the depth direction.

In some embodiments, the means for synchronously moving the first and second immersion tanks comprises: a first retractable support and a second retractable support for supporting the first and second immersion tanks housed in the at least one of the storage levels when the first and second immersion tanks are moved to the access position, the first and second retractable supports being operatively connected to the frame and movable between a retracted position and a deployed position, the first and second retractable supports extending further from the frame along the depth direction in the deployed position than in the retracted position in order to support the first and second immersion tanks respectively in the access position.

In some embodiments, each of the immersion tanks weighs between 500 and 3500 kg.

According to another aspect of the present technology, there is provided a method for storing and accessing immersion tanks in a data center. The method comprises: providing a frame defining a plurality of storage levels disposed above one another; providing a plurality of immersion tanks supported by the frame, each storage level housing a first immersion tank and a second immersion tank; synchronously moving the first and second immersion tanks housed in at least one of the storage levels between a storage position and an access position, in the storage position, the first and second immersion tanks being spaced from each other by a first distance; and in the access position, the first and second immersion tanks being spaced from each other by a second distance greater than the first distance, wherein in the access position, the first and second immersion tanks are accessible by an operator for accessing the electronic devices contained therein.

In some embodiments, synchronously moving the first and second immersion tanks comprises maintaining the first and second immersion tanks generally symmetrical to each other relative to a fixed vertical plane extending therebetween throughout a range of motion between the storage position and the access position.

In some embodiments, synchronously moving the first and second immersion tanks comprises actuating an actuator to cause the first and second immersion tanks to move between the storage and access positions.

In some embodiments, synchronously moving the first and second immersion tanks comprises deploying first and second retractable supports for supporting the first and second immersion tanks housed in the at least one of the storage levels when the first and second immersion tanks are moved to the access position.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

In the present description, various terms relating to spatial orientation such as "front", "rear", "top", "bottom", "left", "right", "upward", "downward", etc. will be used to provide a clear description of the present technology. However, it is understood that these terms are merely used to improve the clarity of the description and in no way are meant to be limiting in regard to orientation.

Figure 1:
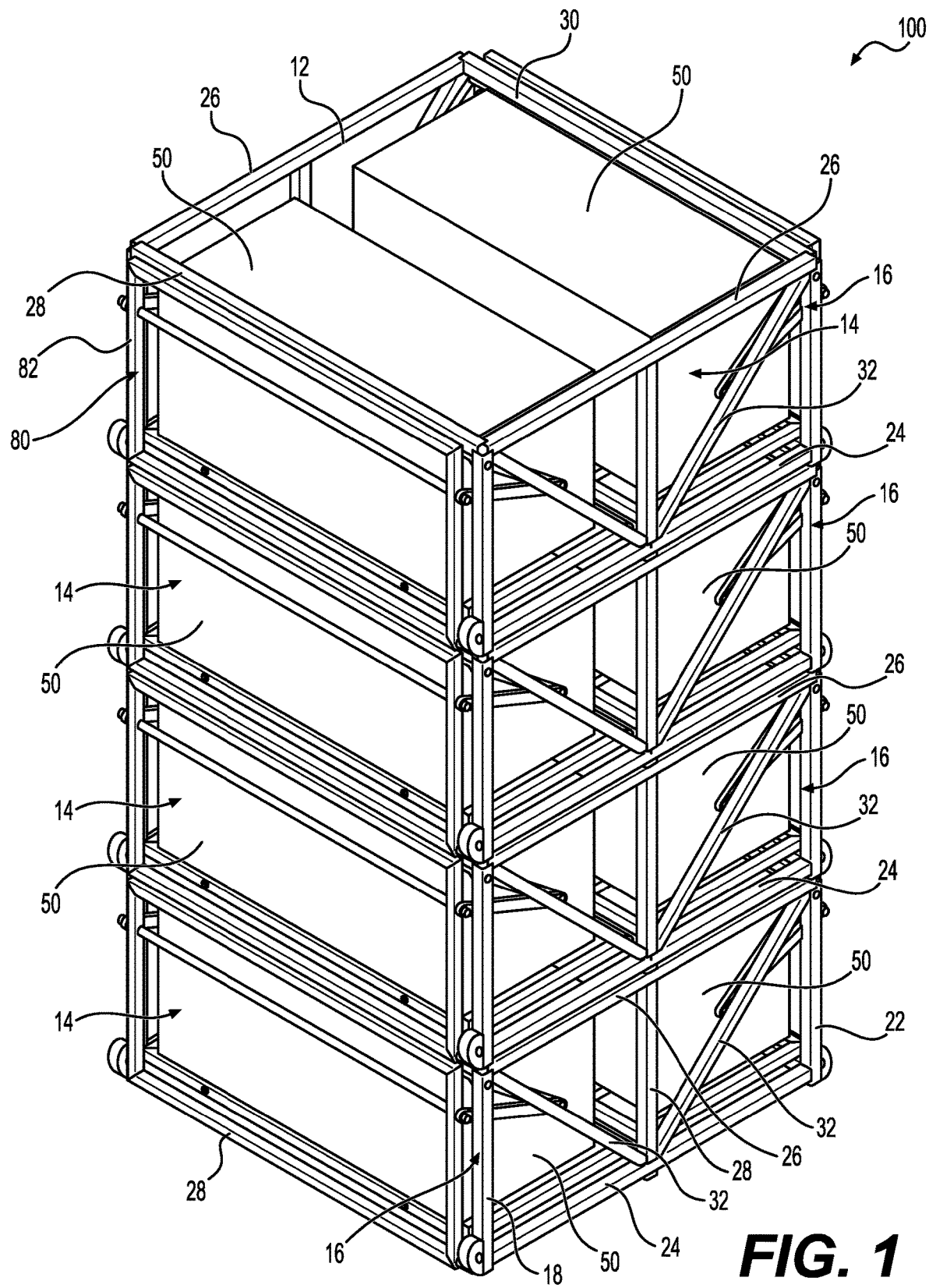
FIG. 1 is a perspective view, taken from a top, front, right side, of an immersion tank storage system according to an embodiment of the present technology.
Figure 2:
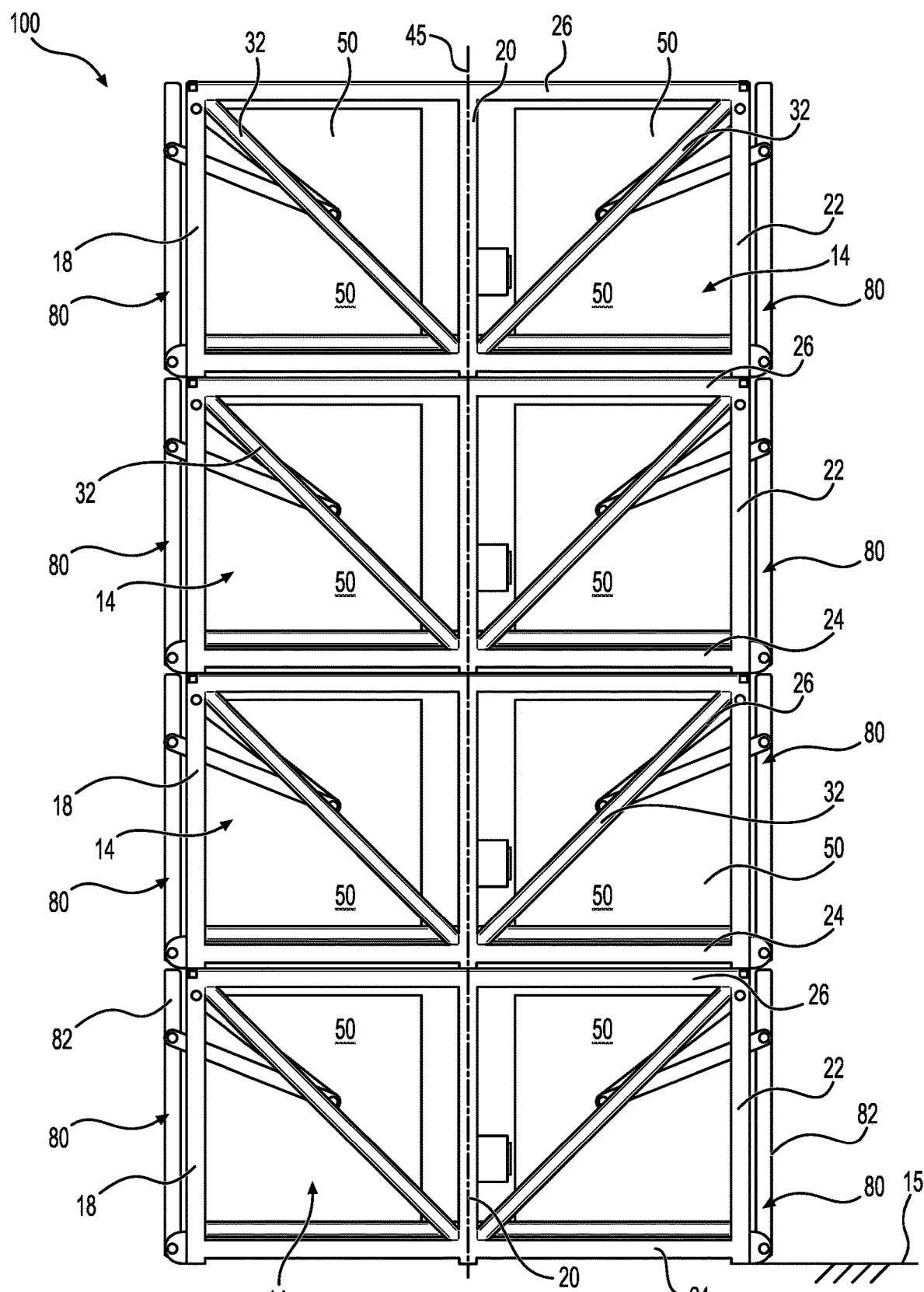
FIG. 2 is a left side elevation view of the immersion tank storage system of FIG. 1.

FIGS. 1 and 2 show an immersion tank storage system 100 for use in a data center. The data center is designed to contain various such immersion tank storage systems 100 in order to maximize the amount of computer systems (i.e., servers) that can operate therein. Notably, the immersion tank storage system 100 includes a plurality of immersion tanks 50 configured to contain various electronic devices 70 (FIG. 3) such as computer systems (e.g., servers) and other associated components (e.g., networking components). In use, a plurality of immersion tank storage systems 100 may be arranged in parallel rows within the data center, where an operator can circulate in the aisles formed between the rows in order to access the immersion tank storage systems 100.

The immersion tank storage system 100 includes a frame 12 and the immersion tanks 50 that are supported by the frame 12. The frame 12 is a load-bearing metallic structure that is supported on a support surface 15 (FIG. 2), such as a ground surface, and defines a plurality of storage levels 14 disposed above one another. As such, the frame 12 exploits the height of the data center to store additional servers, thereby providing an efficient use of the space provided by the data center. In this embodiment, the frame 12 comprises a plurality of interconnected sub-frames 16, each sub-frame 16 defining a respective storage level 14. The sub-frames 16 are connected to one another to form the frame 12. This may allow for greater adaptability of the frame 12 to the particular dimensions of a given data center. It is contemplated that the frame 12 could instead be an integrally built frame in other embodiments.

In this embodiment, each sub-frame 16 has a plurality of vertical members 18, 20, 22 including two front vertical members 18, two middle vertical members 20 and two rear vertical members 22 that are parallel to one another and offset in a depth direction (i.e., a front-to-rear direction) of the frame 12. The sub-frame 16 also has a plurality of longitudinally-extending members 24, 26 that extend horizontally and in the depth direction, including left and right lower longitudinally-extending members 24 and left and right upper longitudinally-extending members 26. The left and right longitudinally-extending members 24, 26 are spaced apart in a lateral direction of the frame 12. The sub-frame 16 also has a plurality of laterally-extending members 28, 30 that extend horizontally and in the lateral direction, including upper and lower front laterally-extending members 28, and upper and lower rear laterally-extending members 30. The front and rear laterally-extending members 28, 30 are spaced apart from one another in the depth direction of the frame 12. Diagonal bracing members 32 are also provided at each lateral side of the sub-frame 16. The vertical members 18, 20, 22, the longitudinally-extending members 24, 26, the laterally-extending members 28, 30 and the bracing members 32 are connected to one another to form the sub-frame 16. The sub-frame 16 defines a generally rectangular perimeter that delineates the storage level 14 in which the corresponding immersion tanks 50 can be housed. In this embodiment, each storage level 14 is configured to house two immersion tanks 50 offset from one another in the depth direction.

The sub-frames 16 are stacked atop one another and connected to one another to form the frame 12. For instance, in this embodiment, the sub-frames 16 are fastened to one another by mechanical fasteners. The sub-frames 16 may be fastened to one another differently in other embodiments (e.g., by welding). In this embodiment, the frame 12 includes four sub-frames 16 and therefore defines four storage levels 14 disposed one above the other. It is contemplated that the frame 12 could define more or fewer storage levels 14 in other embodiments. Furthermore, it should be understood that the particular construction of the sub-frames 16 and the frame 12 is not intended to be limitative and as they could be configured differently in other embodiments.

Figure 3:
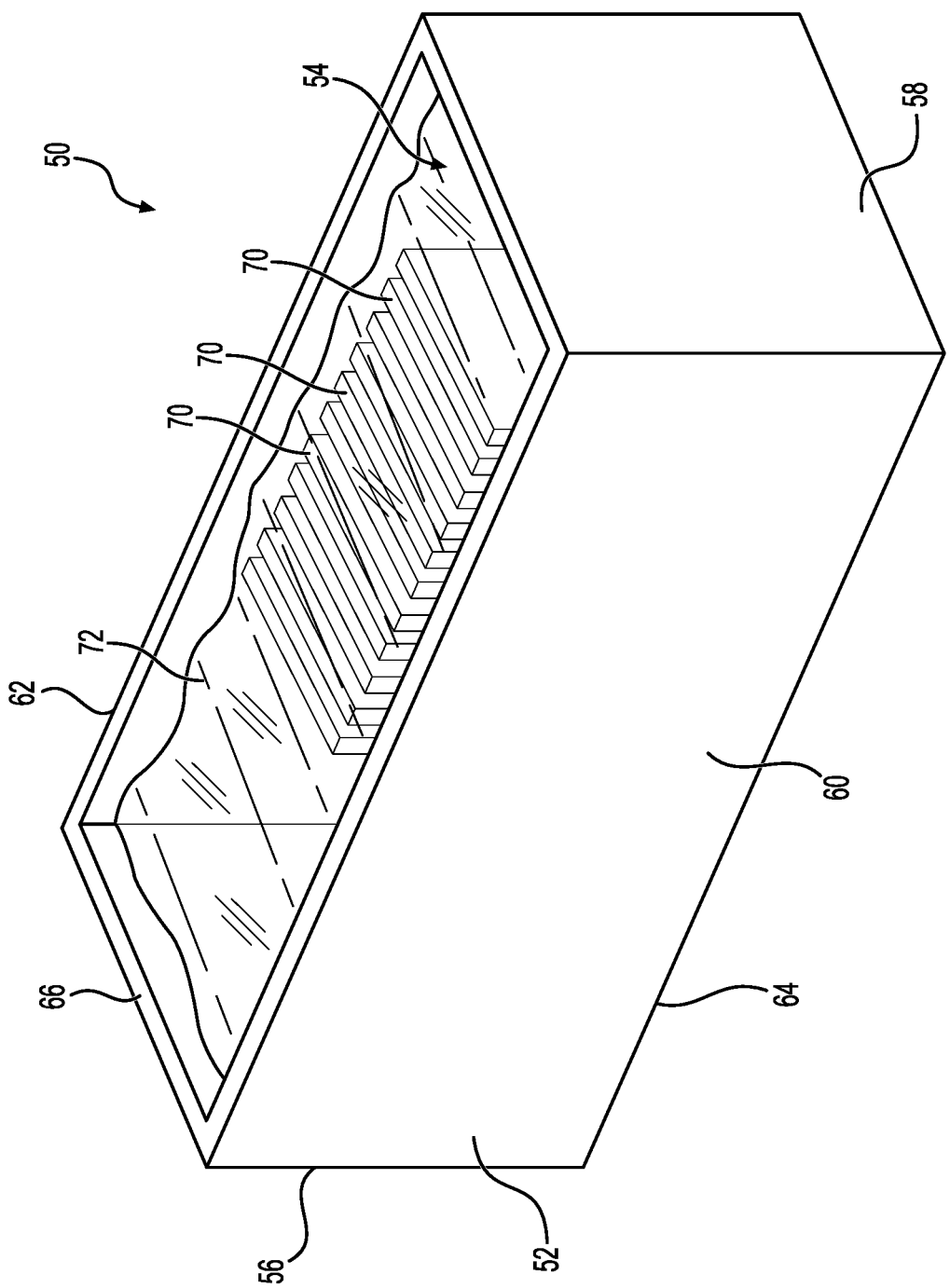
FIG. 3 is a perspective view, taken from a top, front, right side, of an immersion tank of the immersion tank storage system of FIG. 1.

An exemplary one of the immersion tanks 50 will now be described with reference to FIG. 3. The immersion tank 50 has a tank body 52 defining an internal space 54. The tank body 52 defines opposite lateral ends 56, 58 as well as a front and rear ends 60, 62 of the immersion tank 50. Furthermore, the immersion tank 50 has a lower end 64 and an upper end 66. As will be appreciated, the immersion tank 50 is dimensioned to be insertable and removable from the corresponding storage level 14 of the frame 12. In particular, in this embodiment, a width of the immersion tank 50 measured between the lateral ends 56, 58 is less than a width of the frame 12 (measured between the left and right vertical supports 22 for example), and a height of the immersion tank 50 measured between the lower and upper ends 64, 66 is less than a height of the corresponding storage level 14 (measured between the upper and lower longitudinally-extending members 28 for example). The immersion tank 50 is illustrated in FIG. 3 for simplicity and to show the components housed within the internal space 54. As will be understood, in practice, a cover may be provided to entirely enclose the internal space 54.

With continued reference to FIG. 3, the immersion tank 50 is configured to contain electronic devices 70 such as computer systems (e.g., servers) and other associated components (e.g., networking components) within the internal space 54. Notably, in use, the electronic devices 70 generate heat which has to be dissipated to maintain an adequate operating temperature for the electronic devices 70. In this example, the electronic devices 70 are positioned vertically within the internal space 54 and side-by-side to one another. In order to cool the electronic devices 70, the immersion tank 50 contains an immersion cooling liquid 72 in which the electronic devices 70 are immersed. The immersion cooling liquid 72 is a dielectric liquid that is thermally conductive in order to absorb the heat generated by the electronic devices 70. Once the immersion cooling liquid 72 absorbs heat from the electronic devices 70, it can be circulated through a heat exchange system (not shown) in order to cool the immersion cooling liquid 72 back to a suitable temperature for cooling of the electronic devices 70. In other cases, the immersion cooling liquid 72 may be a two-phase liquid such that the immersion cooling liquid 72 boils upon absorbing sufficient heat from the electronic devices 70, thereby evaporating into vapor. A condenser (not shown) may then cool the vapor back to its liquid form to be used again for cooling the electronic devices 70.

As will be appreciated, the immersion tank 50 can be particularly heavy given its contents, namely the electronic devices 70 and the immersion cooling liquid 72. For instance, the immersion tank 50 may weigh approximately between 500 kg and 3500 kg.

When the immersion tanks 50 are to be accessed by an operator, the immersion tanks 50 have to be moved to an adequate position that permits the operator such access. Notably, the position in which the immersion tanks 50 are disposed in FIGS. 1 and 2 does not allow the operator proper access to the contents of the immersion tanks 50. However, due to the significant weight of the immersion tanks 50, moving one of the immersion tanks 50 to a position where its contents are accessible can also result in a substantial force being exerted by the immersion tank 50 on the frame 12. If not managed properly, this could create a hazardous imbalance as a center of gravity of the immersion tank 50 could be positioned such that the frame 12 is off-balance. Therefore, as will now be described in particular with reference to FIGS. 4 to 11, the immersion tank storage system 100 has means for synchronously moving the immersion tanks 50 stored within the frame 12. Notably, the means are in the form of a plurality of displacing devices 150 each of which, as will be described in detail below, is operatively connected to both immersion tanks 50 stored in a given storage level 14 for synchronously moving these immersion tanks 50 between different positions. In particular, each displacing device 150 is configured to move the two immersion tanks 50 housed in a corresponding storage level 14 between a storage position (illustrated in FIGS. 1 and 2) and an access position (illustrated for the immersion tanks 50 in the topmost one of the storage levels 14 in FIGS. 6 and 7).

In this embodiment, in their storage positions, the immersion tanks 50 are stored on the frame 12 and are generally inaccessible to an operator. That is, the operator is not free to access the internal space 54 defined by the tank body 52 (and thereby the electronic devices 70). Notably, in the storage position, the immersion tanks 50 are contained within the perimeter of the frame 12 such that the immersion tanks 50 of a given storage level 14 are spaced from one another by a relatively small distance (FIG. 2) along the depth direction of the frame 12. For instance, the centers of gravity CG of the two immersion tanks 50 are disposed inwardly from opposite ends of the frame 12 along the depth direction such that a distance between the centers of gravity CG of both immersion tanks 50 is less than the distance between the opposite ends of the frame 12 in the depth direction. In some cases, the immersion tanks 50 of a given storage level 14 may even be abutting one another in their storage positions (i.e., the distance D1 could be null).

On the other hand, in their access positions, the immersion tanks 50 are accessible by the operator to access the electronic devices 70 contained therein. In particular, when the two immersion tanks 50 of a given storage level 14 are in their access positions, the two immersion tanks 50 are spaced from each other by a relatively large distance D2 (FIG. 7) that is greater than the distance D1. As a result, the immersion tanks 50 of the given storage level 14 are disposed at least in part outside of the perimeter of the frame 12. More specifically, the two immersion tanks 50 of the given storage level 14 are disposed outwardly from opposite ends of the frame 12 along the depth direction. As such, the front immersion tank 50 is disposed at least partly frontward of the front end of the frame 12, while the rear immersion tank 50 is disposed at least partly rearward of the rear end of the frame 12. Notably, the centers of gravity CG of the two immersion tanks 50 are disposed outwardly from opposite ends of the frame 12 along the depth direction.

The synchronous movement of the immersion tanks 50 of a given storage level 14 between the storage and access positions ensures that generally equivalent moments are applied on the frame 12 by opposing immersion tanks 50 as each pair of immersion tanks 50 is moved between the storage and access positions. Notably, as the two immersion tanks 50 of a given storage level 14 are moved at the same time (i.e., synchronously) to their respective access or storage positions, their centers of gravity CG (FIGS. 5, 7) are positioned throughout said movement such as to generate generally equivalent moments on the frame 12. As such, the frame 12 is not in danger of being off-balance when the immersion tanks 50 are moved between the storage and access positions. Furthermore, in this embodiment, throughout a range of motion between their storage and access positions, the front and rear immersion tanks 50 of a given storage level 14 remain generally symmetrical to each other relative to a fixed vertical plane 45 extending between the front and rear immersion cooling tanks 50. Therefore, since in this embodiment all of the immersion tanks 50 are identical, this ensures that their respective centers of gravity CG are at equivalent distances from the vertical plane 45 as the immersion tanks 50 move between the storage and access positions.

Figure 4:
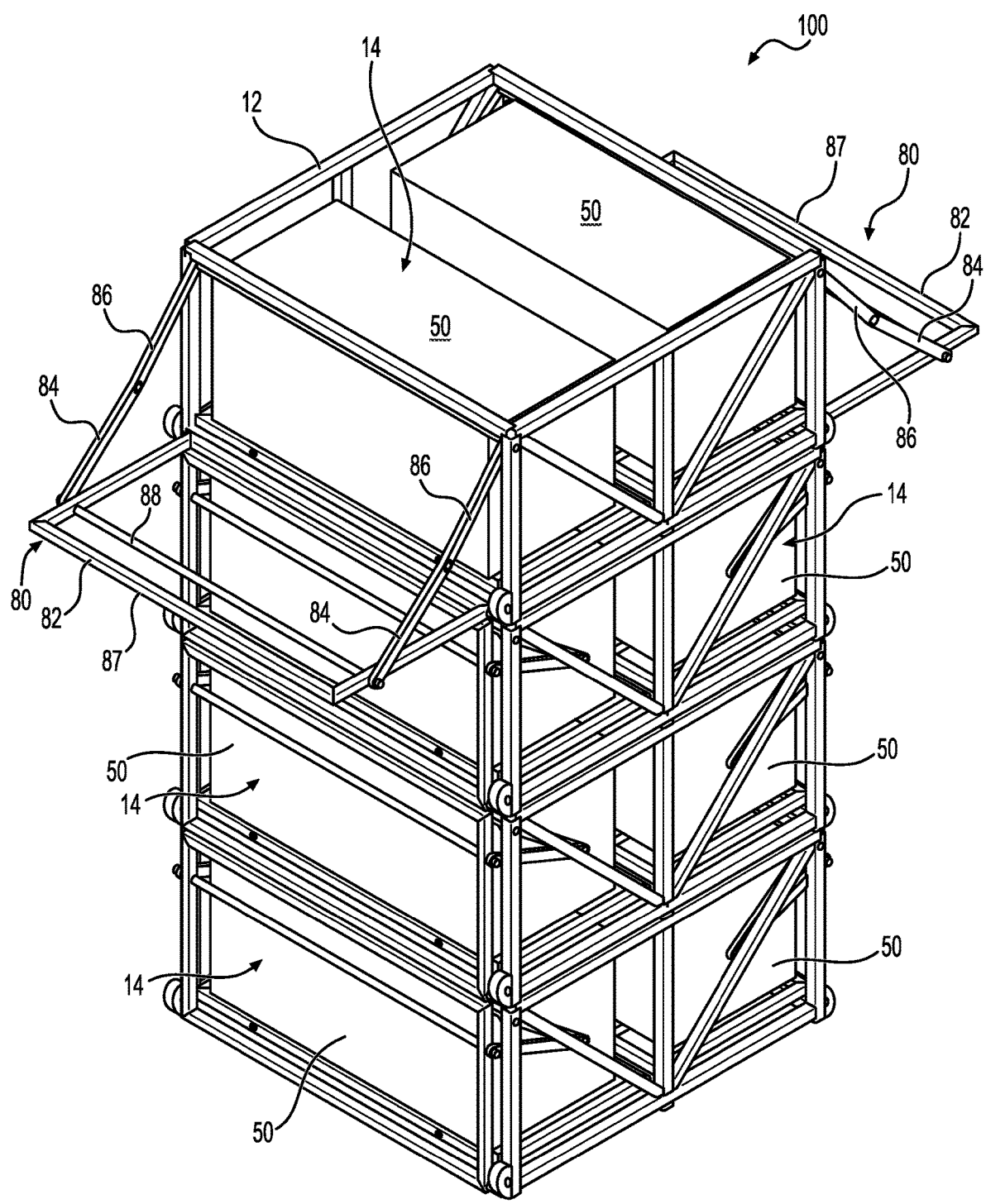
FIG. 4 is a perspective view, taken from a top, front, right side, of the immersion tank storage system of FIG. 1, showing two retractable supports of the immersion tank storage system in deployed positions.

With particular reference now to FIG. 4, the immersion tank storage system 100 has a plurality of retractable supports 80 for supporting the immersion tanks 50 when the immersion tanks 50 are in the access position. More specifically, each retractable support 80 is configured to support a corresponding one of the immersion tanks 50 when that immersion tank 50 is in the access position. As such, each retractable support 80 is disposed either at the front end or the rear end of the frame 12, aligned with a corresponding one of the immersion tanks 50. In this embodiment, each retractable support 80 is operatively connected to the frame 12 and is movable between a retracted position (shown in FIGS. 1 and 2) and a deployed position (shown for the topmost immersion tanks 50 in FIGS. 4 and 5). As can be seen, the retractable support 80 extends further from the frame 12 along the depth direction in the deployed position than in the retracted position in order to support the corresponding immersion tank 50 in its access position.

Figure 5:
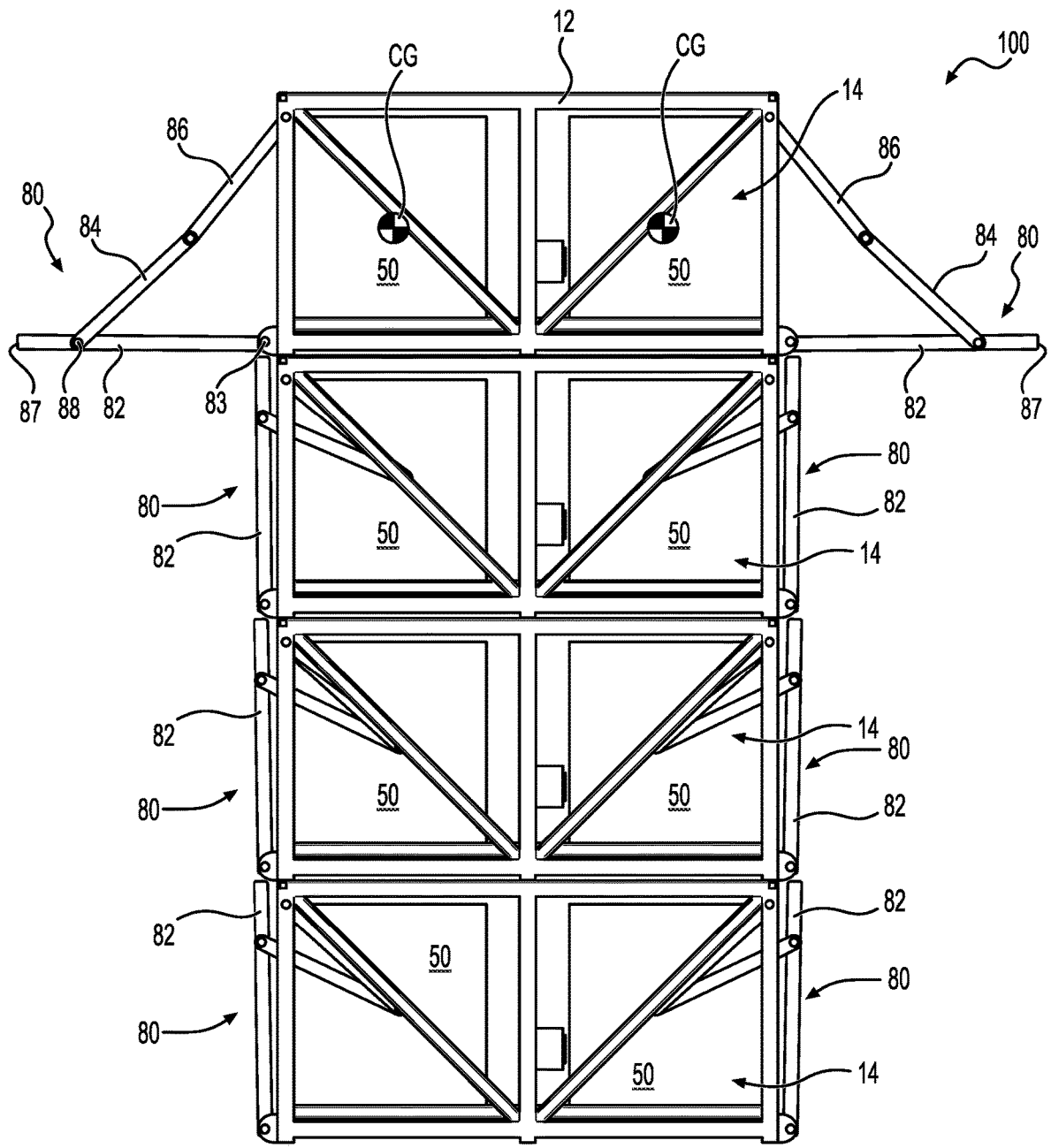
FIG. 5 is a left side elevation view of the immersion tank storage system of FIG. 4.

In this embodiment, the retractable supports 80 are all identical and therefore only one of the retractable supports 80 will be described in detail herein. It is to be understood that the same description applies to the other retractable supports 80. In this example, each retractable support 80 includes a support base 82 that is movably connected to the frame 12. In particular, the support base 82 is pivotable relative to the frame 12 about a pivot axis 83 (FIG. 5) between the deployed and retracted positions of the retractable support 80. The pivot axis 83 extends in the lateral direction of the frame 12. As shown in FIG. 4, in this embodiment, the support base 82 is a generally rectangular framework. In this embodiment, in the retracted position of the retractable support 80, as best shown in FIG. 2, the support base 82 extends generally vertically (e.g., generally parallel to the vertical plane 45). On the other hand, in the deployed position of the retractable support 80, as best shown in FIG. 5, the support base 82 extends generally horizontally. As such, as shown in FIGS. 4 and 5, an end 87 of the support base 82 that is furthest from the pivot axis 83 is disposed further from the frame 12 (along the depth direction) when the retractable support 80 is in the deployed position than when the retractable support 80 is in the retracted position. The retractable support 80 also has a plurality of links which are connected between the frame 12 and the support base 82 to set a range of motion of the support base 82. Notably, in this embodiment, two left links 84, 86 and two right links 84, 86 interconnect the support base 82 to the frame 12. In particular, the left links 84, 86 include a lower link 84 and an upper link 86 which are pivotally connected to one another. The upper link 86 is pivotally connected to the frame 12 about a pivot axis (not shown) that is vertically higher than the pivot axis 83 about which the support base 82 is pivoted. The lower link 84 is pivotally connected to the support base 82, namely via a pivot axle 88 extending laterally across the support base 82. The right links 84, 86 are configured identically to the left links 84, 86 and connected to the support base 82 on an opposite lateral side thereof. As can be seen in FIG. 4, in this embodiment, the links 84, 86 set the limit position of the support base 82 when the retractable support 80 is in the deployed position such that the support base 82 is generally horizontal in the deployed position.

It is contemplated that the position of the support base 82 may be set differently than through the links 84, 86 in other embodiments.

In this embodiment, the retractable supports 80 are manually movable between the deployed and retracted positions. Notably, when the immersion tanks 50 of a given storage level 14 are stored on the frame 12 and the corresponding retractable supports 80 are in the retracted position, the movement of the immersion tanks 80 from the storage position to the access position forces the corresponding retractable supports 80 into the deployed position. Once the immersion tanks 50 are returned to the storage position, the retractable supports 80 can be manually moved back to the retracted position.

It is contemplated that, in other embodiments, the motion of the retractable supports 80 may instead be automated such that a controller controls an actuator to move the retractable supports 80 between the deployed and retracted positions.

Figure 6:
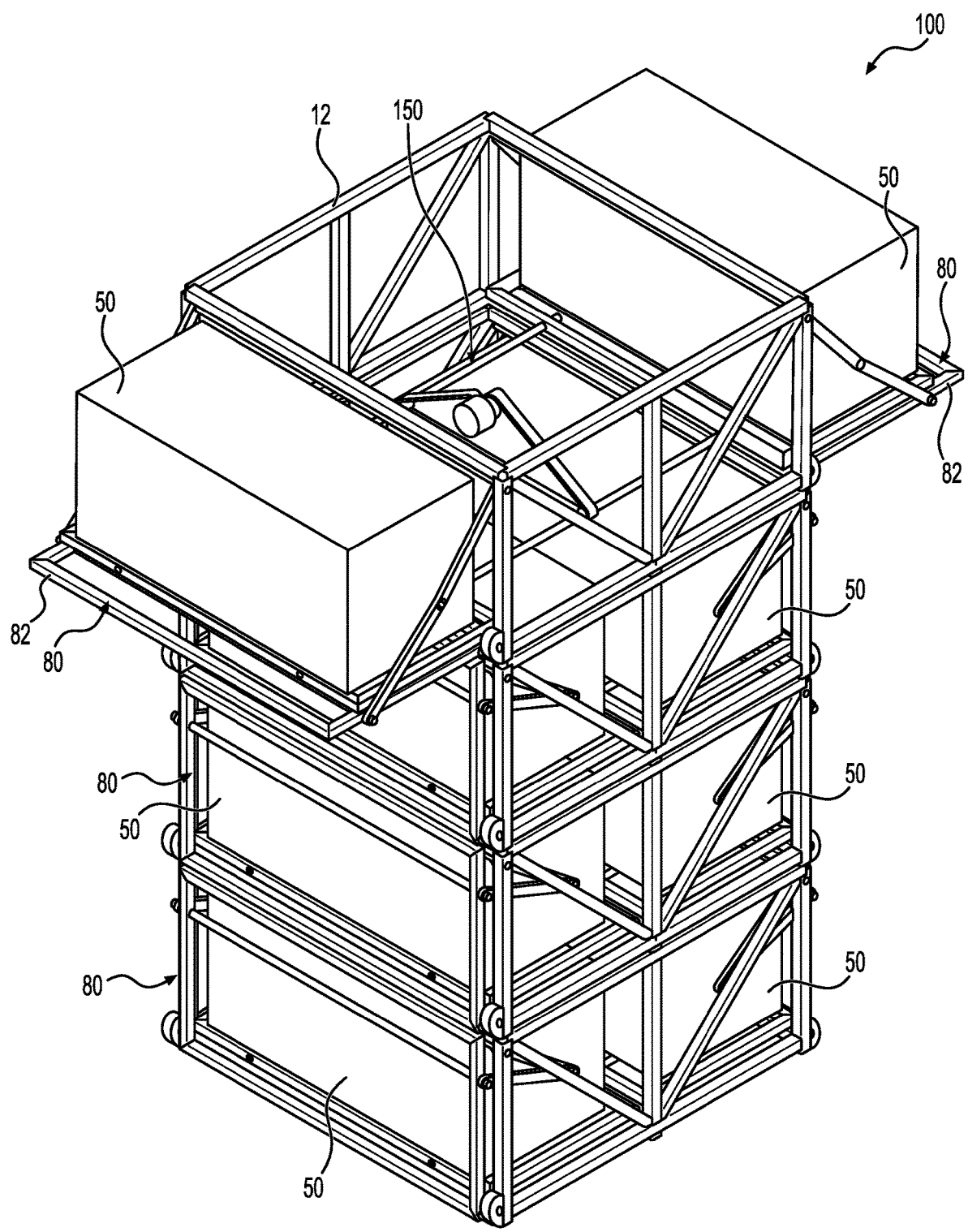
FIG. 6 is a perspective view, taken from a top, front, right side, of the immersion tank storage system of FIG. 1, showing two of the immersion tanks in access positions thereof.

Referring now to FIG. 6, each displacing device 150 includes two moving platforms 90 that support the corresponding immersion tanks 50 of a given storage level 14. The two moving platforms 90 will be referred to herein as front and rear moving platforms 90 for clarity. The front and rear moving platforms 90 are movable relative to the frame 12 such as to carry the immersion tanks 50 from the storage position to the access position and vice-versa. Notably, the front and rear moving platforms 90 are slidable on the frame 12 when moving the immersion tanks 50 from the storage and access positions. In some embodiments, the moving platforms 90 may be engaged in sliding rails to guide the movement of the moving platforms 90. As will be described in detail below, the front and rear moving platforms 90 are operatively connected to one another such that the front and rear moving platforms 90 are movable synchronously to translate the immersion tanks 50 between the storage and access positions.

In this embodiment, each moving platform 90 is a rectangular framework dimensioned to support the corresponding immersion tank 50 thereon. It is contemplated that the moving platforms 90 could be configured differently in other embodiments.

Figure 7:
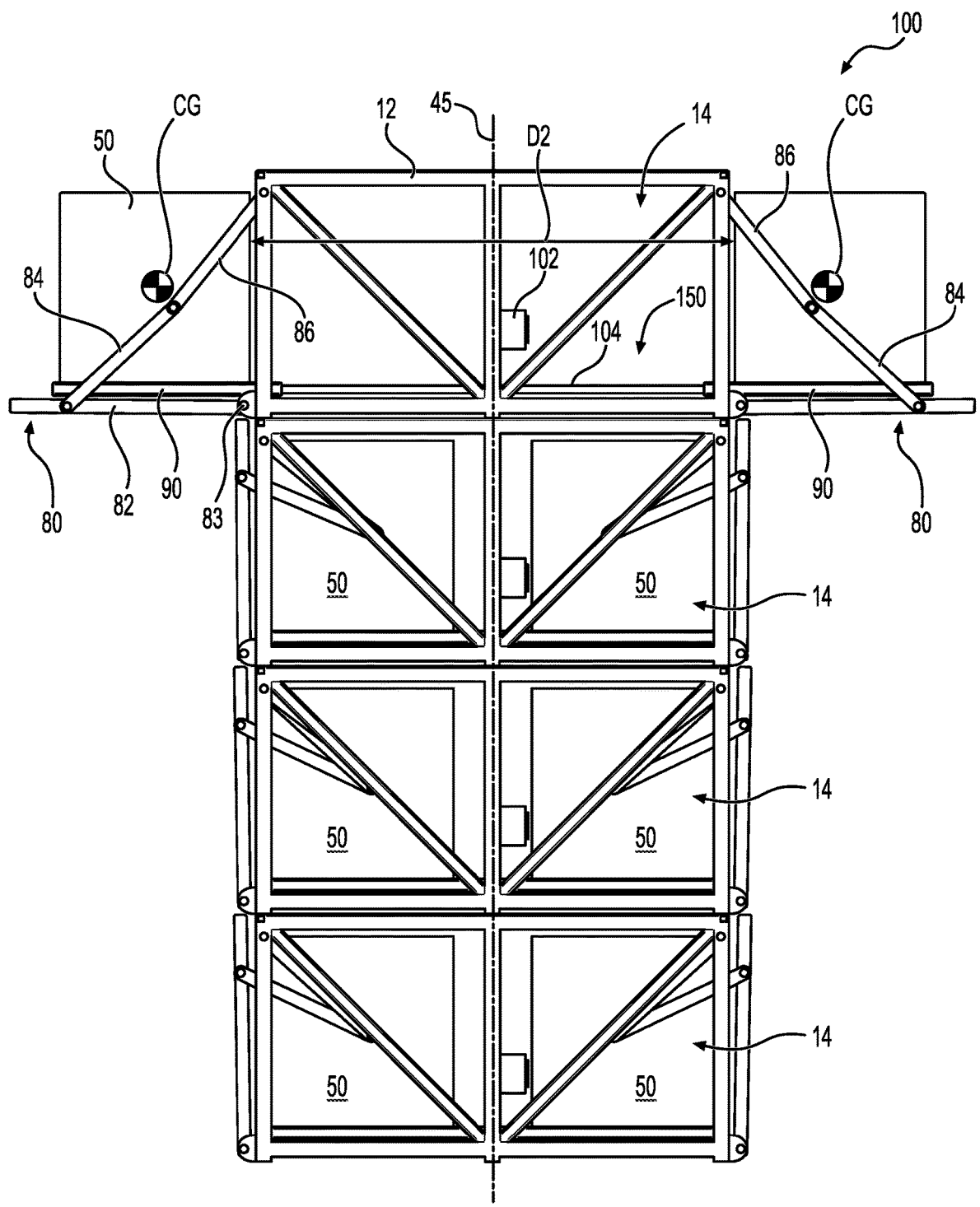
FIG. 7 is a left side elevation view of the immersion tank storage system of FIG. 6.
Figure 8:
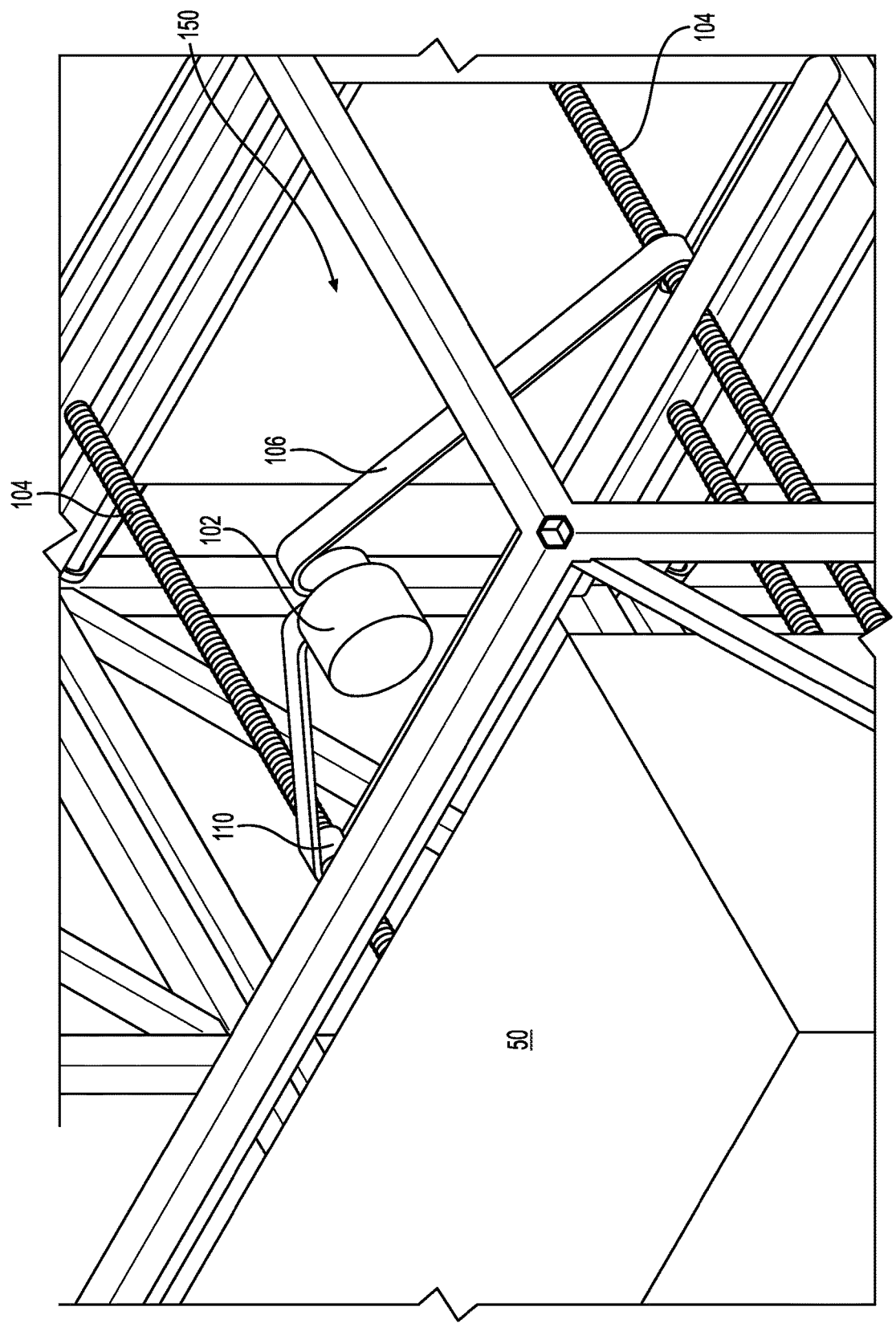
FIG. 8 is a detailed view of the immersion tank storage system of FIG. 6, showing in part a displacing device of the immersion tank storage system.
Figure 9:
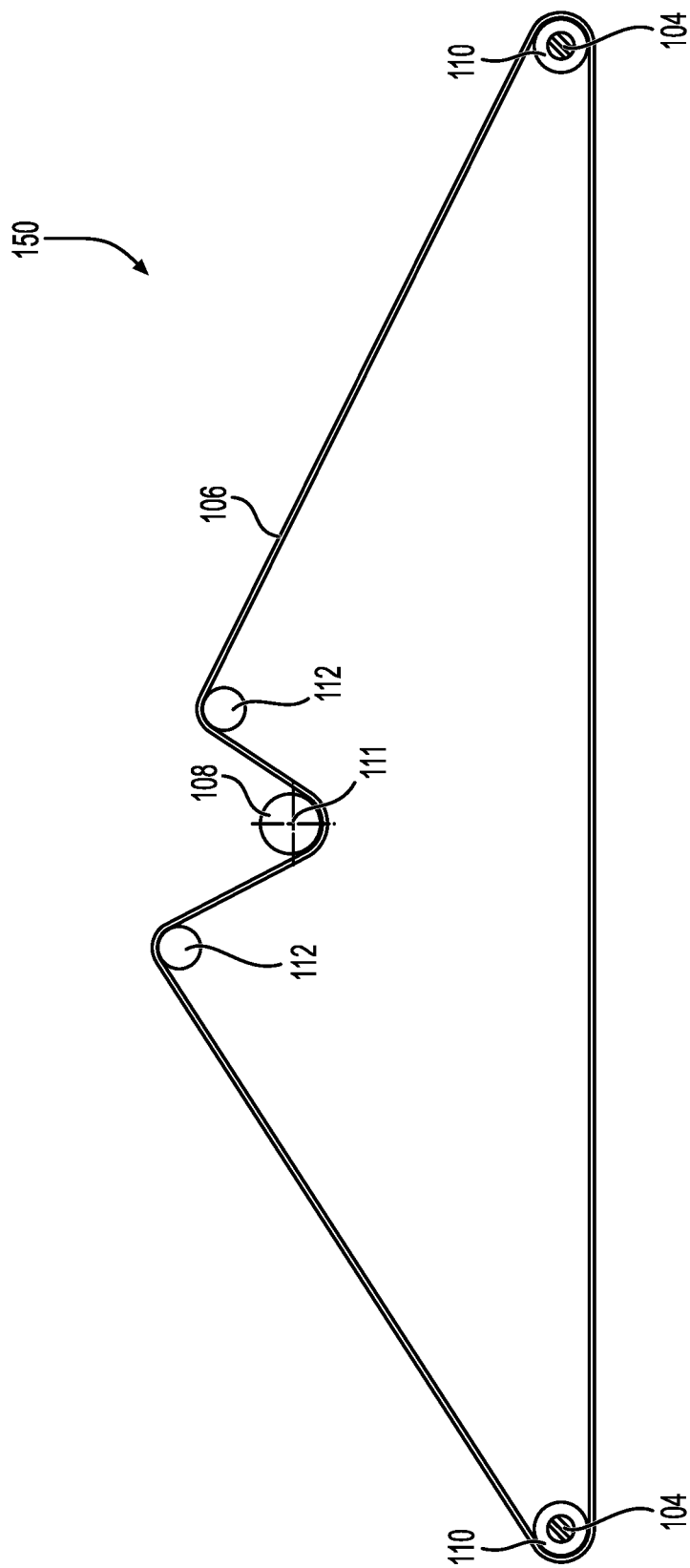
FIG. 9 is a schematic view of part of the displacing device of FIG. 8.

With reference to FIGS. 8 and 9, in this embodiment, each displacing device 150 includes an actuator 102 and two rotary members 104 operatively connected to the actuator 102 such that the rotary members 104 are driven by the actuator 102. The rotary members 104 are operatively connected to the two corresponding immersion tanks 50, in particular to the front and rear moving platforms 90 supporting them. In this embodiment, the actuator 102 is a motor and the rotary members 104 are lead screws which threadedly engage the moving platforms 90 to translate them as the lead screws 104 are rotated by the motor 102. It is contemplated that the actuator 102 could be a manually operated actuator in other embodiments (e.g., a crank). As shown in FIGS. 7 and 8, the lead screws 104 extend in the depth direction of the frame 12 and traverse respective threaded openings (not shown) defined by the front and rear moving platforms 90. As such, when the lead screws 104 rotate about their respective axes, the front and rear moving platforms 90 are translated in the depth direction of the frame 12. In this embodiment, a flexible link 106 operatively connects the motor 102 to the lead screws 104. In particular, the flexible link 106 engages and is driven by a sprocket 108 that is rotated by the motor 102 about a motor shaft axis 111. In this embodiment, the flexible link 106 is a transmission belt. Two idlers 112 are provided about which the transmission belt 106 is wrapped for tensioning thereof. A mounting base (not shown for clarity) is provided to which the motor 102 and the idlers 112 are mounted.

The transmission belt 106 is also wrapped about left and right sleeves 110 to drive the sleeves 110. Each sleeve 110 receives therein a respective one of the lead screws 104 and rotates with the corresponding lead screw 104 such that, when the transmission belt 106 is rotating, the sleeves 110 cause the lead screws 104 to rotate therewith. In turn, the rotation of the lead screws 104, which threadedly engage the front and rear moving platforms 90, causes the front and rear moving platforms 90 to move in the depth direction.

With this configuration, when the sprocket 108 is driven in one direction (e.g., clockwise), the front and rear moving platforms 90 synchronously move away from each other such that the distance therebetween is increased. On the other hand, when the sprocket 108 is driven in the opposite direction (e.g., counterclockwise), the front and rear moving platforms 90 synchronously move toward each other such that the distance therebetween is decreased. In this embodiment, position indicators 115 (FIG. 10) are provided to deactivate the motor 102 when the moving platforms 90 reach their storage and access positions. The position indicators 115 may be sensors or limit switches for example. Stoppers may also be provided to physically abut the moving platforms 90 and/or the immersion tanks 50 to prevent them from moving further outward from the access position and from moving further inward from the storage position.

Figure 10:
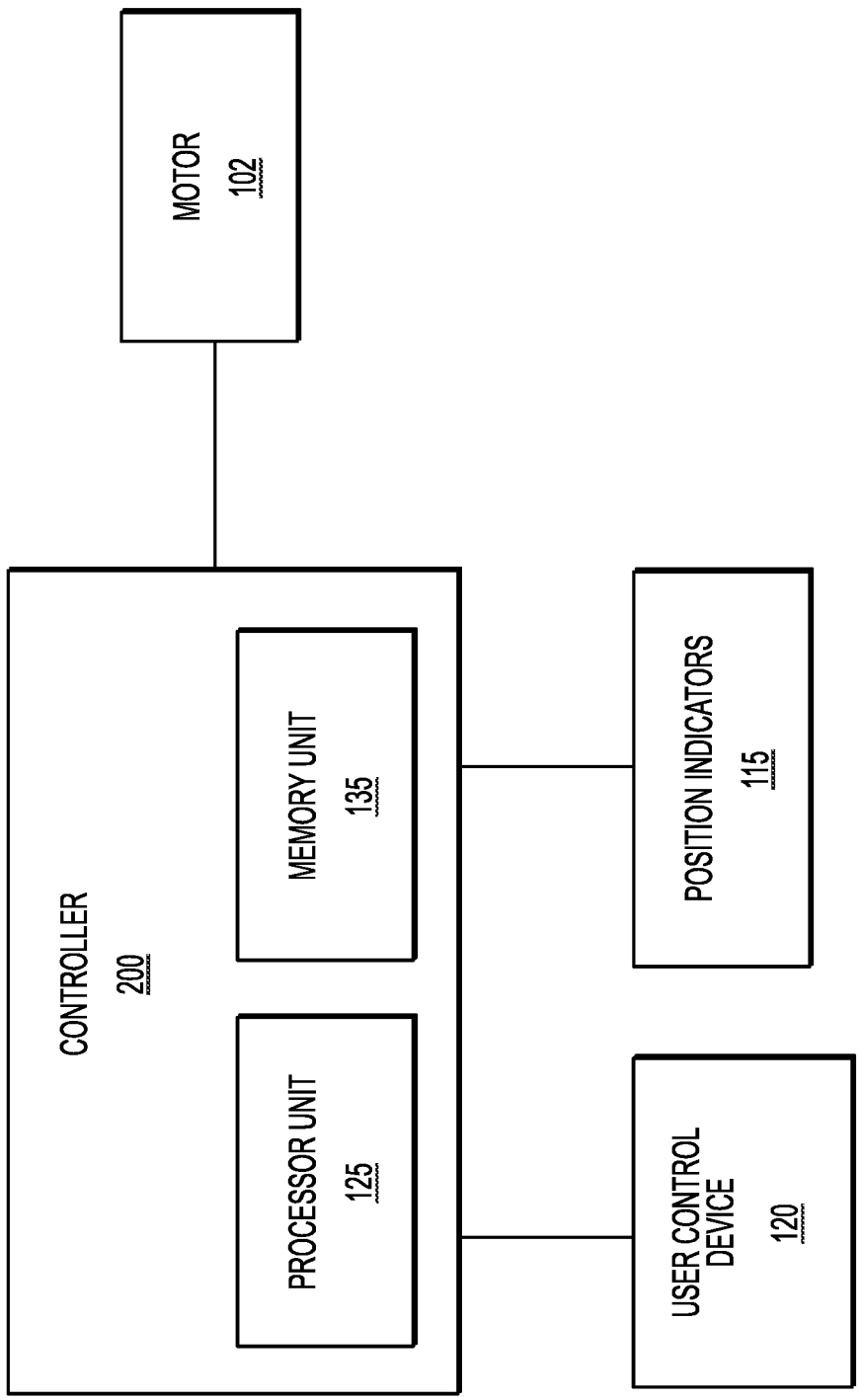
FIG. 10 is a block diagram of a controller configured to control the displacing device of FIG. 8.

In this embodiment, with reference to FIG. 10, a controller 200 is provided for actuating each of the displacing devices 150. Notably, the controller 200 is in communication with the motor 102 in order to control its actuation, as well as with the position indicators 115 on the basis of which the controller 200 can also control the motor 102. The controller 200 is also in communication with a user control device 120 that is operable by a user to selectively actuate the displacing devices 150. For instance, the user control device 120 may be a handheld remote allowing the user to selectively actuate the displacing devices 150 to move the immersion tanks 50 stored in one or more of the storage levels 14 towards their access positions and storage positions. As shown in FIG. 10, the controller 200 has a processor unit 125 for carrying out executable code, and a non-transitory memory unit 135 that stores the executable code in a non-transitory medium (not shown) included in the memory unit 135. The processor unit 125 includes one or more processors for performing processing operations that implement functionality of the controller 200. The processor unit 125 may be a general-purpose processor or may be a specific-purpose processor comprising one or more preprogrammed hardware or firmware elements (e.g., application-specific integrated circuits (ASICs), electrically erasable programmable read-only memories (EEPROMs), etc.) or other related elements. The non-transitory medium of the memory unit 135 may be a semiconductor memory (e.g., read-only memory (ROM) and/or random-access memory (RAM)), a magnetic storage medium, an optical storage medium, and/or any other suitable type of memory.

Thus, in this embodiment, with all of the immersion tanks 50 being initially disposed in their storage positions, an operator wishing to gain access to a selected immersion tank 50 (e.g., to perform maintenance on the immersion tank 50 and/or the electronic devices 70) actuates the corresponding displacing device 150 (e.g., via the user control device 120) in order to move the selected immersion tank 50 to its access position. In response, the displacing device 150 causes the selected immersion tank 50 and the other immersion tank 50 stored on the same storage level 14 to move in opposite directions toward their respective access positions. Notably, the corresponding front and rear moving platforms 90 are displaced by the rotation of the lead screws 104 (driven by the motor 102). As the two immersion tanks 50 move toward their access positions, the retractable supports 80 move to their deployed positions. The front and rear immersion tanks 50 are then supported by the retractable supports 80 as the immersion tanks 50 reach their access positions. The operator is then free to access the immersion tank 50 and/or the electronic devices 70 contained therein. Once the operator has finished accessing the immersion tank 50, the operator again actuates the corresponding displacing device 150 to cause the two immersion tanks 50 to move back toward their storage positions (i.e., move toward one another). The retractable supports 80 can then be moved back to their retracted positions.

Figure 11:
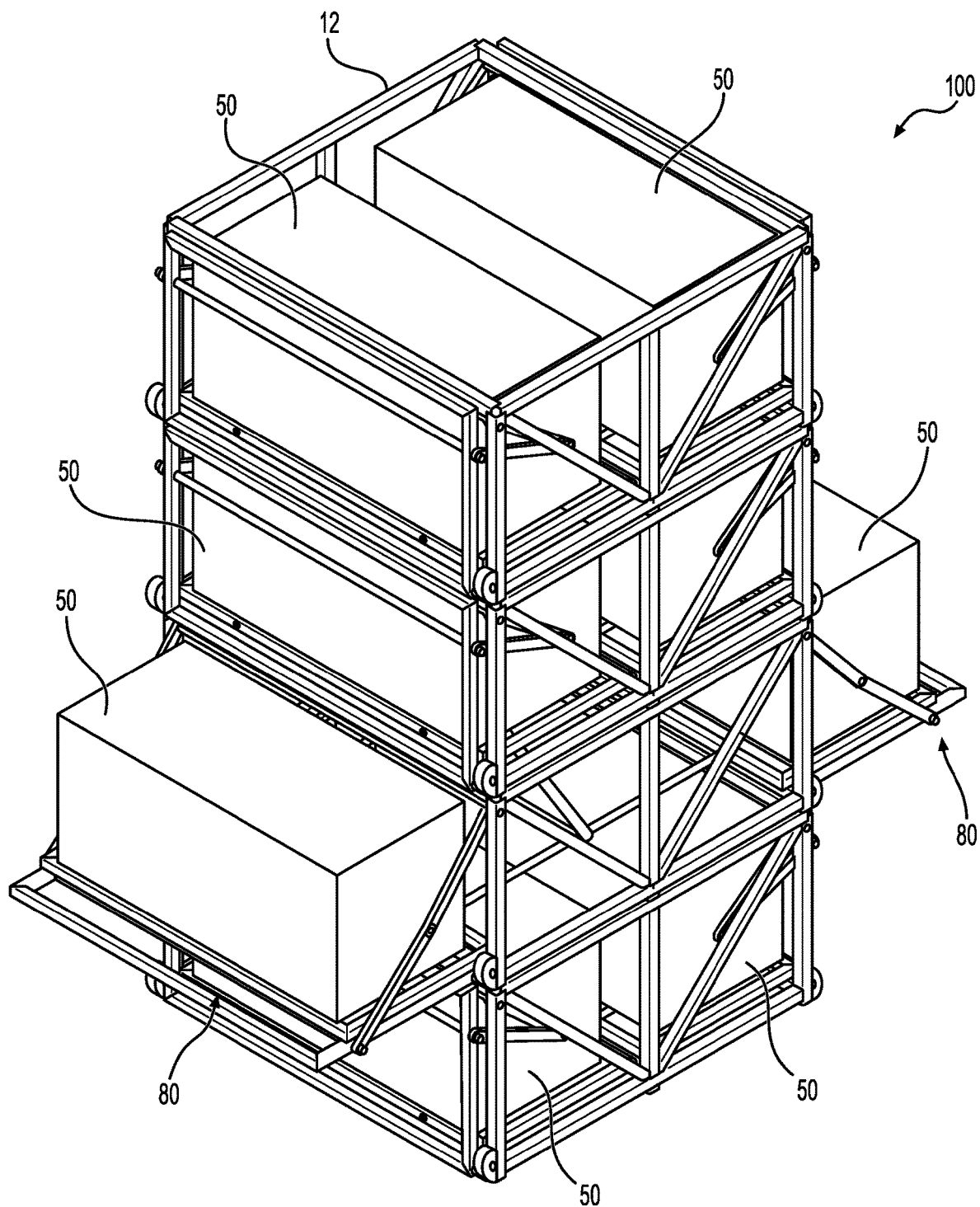
FIG. 11 is a perspective view, taken from a top, front, right side, of the immersion tank storage system of FIG. 1, showing two of the immersion tanks corresponding to another storage level of a frame of the immersion tank storage system in deployed positions.
Figure 12:
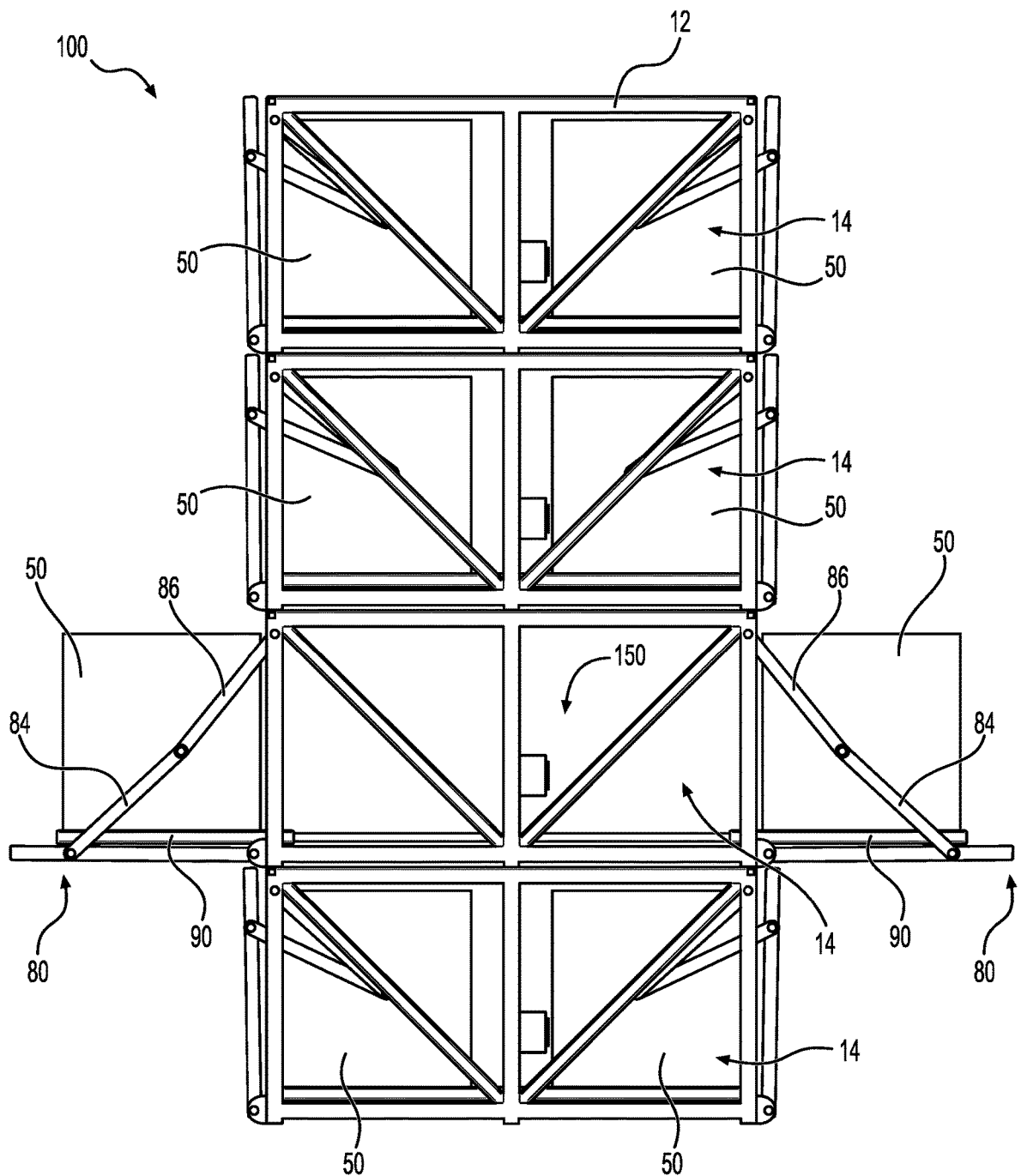
FIG. 12 is a left side elevation view of the immersion tank storage system of FIG. 11.

This method for storing and accessing the immersion tanks 50 is carried out in the same manner to access the immersion tanks 50 stored in any of the storage levels 14. For instance, FIGS. 11 and 12 shows the immersion tanks 50 corresponding to the second storage level 14 of the frame 12 being in their access positions in the same manner as described above with regard to the immersion tanks 50 stored in the topmost storage level 14.

As will be understood from the above, the immersion tank translation system 100 allows for efficient storage of immersion tanks within a data center, thereby allowing a greater quantity of servers to be stored therein, while at the same time providing a safe manner for storing and accessing the immersion tanks 50.

The immersion tank storage system 100 implemented in accordance with some non-limiting implementations of the present technology can be represented as presented in the following numbered clauses.

CLAUSE 1. An immersion tank storage system (100) for a data center, comprising: a frame (12) defining a plurality of storage levels (14) disposed above one another; a plurality of immersion tanks (50) supported by the frame (12), each immersion tank (50) being configured to contain electronic devices (70) and an immersion cooling liquid (72) in which the electronic devices (70) are immersed for cooling thereof, each storage level (14) being configured to house first and second immersion tanks (50) of the plurality of immersion tanks (50); and a displacing device (150) for synchronously moving the first and second immersion tanks (50) housed in at least one of the storage levels (14) between: a storage position in which the first and second immersion tanks (50) are spaced from each other by a first distance (D1); and an access position in which the first and second immersion tanks (50) are spaced from each other by a second distance (D2) greater than the first distance (D1), wherein in the access position, the first and second immersion tanks (50) are accessible by an operator for accessing the electronic devices (70) contained therein.

CLAUSE 2. The immersion tank storage system of clause 1, wherein, throughout a range of motion between the storage position and the access position, the first and second immersion tanks (50) remain generally symmetrical to each other relative to a fixed vertical plane (45) extending between the first and second immersion tanks (50).

CLAUSE 3. The immersion tank storage system of clause 1 or 2, wherein the displacing device (150) for synchronously moving the first and second immersion tanks (50) comprises: a first moving platform (70) supporting the first immersion tank (50) housed in the at least one of the storage levels (14), the first moving platform (70) being movable relative to the frame (12); and a second moving platform (70) supporting the second immersion tank (50) housed in the at least one of the storage levels (14), the second moving platform (70) being movable relative to the frame (12), the first and second moving platforms (70) being operatively connected to each other such that the first and second moving platforms (70) are movable synchronously to translate the first and second immersion tanks (50) between the storage and access positions.

CLAUSE 4. The immersion tank storage system of clause 1 or 2, wherein the displacing device (150) for synchronously moving the first and second immersion tanks (50) comprises: an actuator (102); and at least one rotary member (104) operatively connected to the actuator (102) and rotatable thereby, wherein rotation of the at least one rotary member (104) by the actuator (102) causes displacement of the first and second immersion tanks (50) between the storage and access positions.

CLAUSE 5. The immersion tank storage system of clause 4, wherein the actuator (102) is a motor.

CLAUSE 6. The immersion tank storage system of clause 4 or 5, wherein each of the at least one rotary member (104) is a lead screw.

CLAUSE 7. The immersion tank storage system of any one of clauses 4 to 6, wherein the at least one rotary member (104) includes two rotary members laterally spaced apart from one another, the two rotary members (104) being operatively connected to the actuator (102) by a flexible link (106).

CLAUSE 8. The immersion tank storage system of any one of clauses 4 to 7, wherein the displacing device (150) for synchronously moving the first and second immersion tanks (50) further comprises: a first moving platform (90) supporting the first immersion tank (50) housed in the at least one of the storage levels (14); and a second moving platform (90) supporting the second immersion tank (50) housed in the at least one of the storage levels (14), the first and second moving platforms (90) being operatively connected to each other by the at least one rotary member (104), the first and second moving platforms (90) being movable synchronously by the at least one rotary member (104) to translate the first and second immersion tanks (50) between the storage and access positions.

CLAUSE 9. The immersion tank storage system of any one of clauses 1 to 8, wherein the first and second immersion tanks (50) are offset from one another in a depth direction of the frame (12); the first and second immersion tanks (50) housed in the at least one of the storage levels (14) are moved along the depth direction from the storage position to the access position; and in the access position, the first and second immersion tanks (50) are disposed, in the depth direction, at least partially outwardly from opposite ends of the frame (12) along the depth direction.

CLAUSE 10. The immersion tank storage system of clause 9, wherein the displacing device (150) for synchronously moving the first and second immersion tanks (50) comprises: a first retractable support (80) and a second retractable support (80) for supporting the first and second immersion tanks (50) housed in the at least one of the storage levels (14) when the first and second immersion tanks (50) are moved to the access position, the first and second retractable supports (80) being operatively connected to the frame (12) and movable between a retracted position and a deployed position, the first and second retractable supports (80) extending further from the frame (12) along the depth direction in the deployed position than in the retracted position in order to support the first and second immersion tanks (50) respectively in the access position.

CLAUSE 11. The immersion tank storage system of any one of clauses 1 to 10, wherein each of the immersion tanks (50) weighs between 500 and 3500 kg.

CLAUSE 12. A method for storing and accessing immersion tanks (50) in a data center, comprising: providing a frame (12) defining a plurality of storage levels (14) disposed above one another; providing a plurality of immersion tanks (50) supported by the frame (12), each storage level (14) housing a first immersion tank (50) and a second immersion tank (50); synchronously moving the first and second immersion tanks (50) housed in at least one of the storage levels (14) between a storage position and an access position, in the storage position, the first and second immersion tanks (50) being spaced from each other by a first distance (D1); and in the access position, the first and second immersion tanks (50) being spaced from each other by a second distance (D2) greater than the first distance (D1), wherein in the access position, the first and second immersion tanks (50) are accessible by an operator for accessing the electronic devices (70) contained therein.

CLAUSE 13. The method of clause 12, wherein synchronously moving the first and second immersion tanks (50) comprises maintaining the first and second immersion tanks (50) generally symmetrical to each other relative to a fixed vertical plane (45) extending therebetween throughout a range of motion between the storage position and the access position.

CLAUSE 14. The method of clause 12 or 13, wherein synchronously moving the first and second immersion tanks (50) comprises actuating an actuator (102) to cause the first and second immersion tanks (50) to move between the storage and access positions.

CLAUSE 15. The method of any one of clauses 12 to 14, wherein synchronously moving the first and second immersion tanks (50) comprises deploying first and second retractable supports (80) for supporting the first and second immersion tanks (50) housed in the at least one of the storage levels (14) when the first and second immersion tanks (50) are moved to the access position.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. An immersion tank storage system for a data center, comprising:
    a frame defining a plurality of storage levels disposed above one another;
    a plurality of immersion tanks supported by the frame, each immersion tank being configured to contain electronic devices and an immersion cooling liquid in which the electronic devices are immersed for cooling thereof,
    each storage level being configured to house first and second immersion tanks of the plurality of immersion tanks; and
    means for synchronously moving the first and second immersion tanks housed in at least one of the storage levels between:
        a storage position in which the first and second immersion tanks are spaced from each other by a first distance; and
        an access position in which the first and second immersion tanks are spaced from each other by a second distance greater than the first distance, wherein in the access position, the first and second immersion tanks are accessible by an operator for accessing the electronic devices contained therein.

2. The immersion tank storage system of claim 1, wherein, throughout a range of motion between the storage position and the access position, the first and second immersion tanks remain generally symmetrical to each other relative to a fixed vertical plane extending between the first and second immersion tanks.

3. The immersion tank storage system of claim 1, wherein the means for synchronously moving the first and second immersion tanks comprises:
    a first moving platform supporting the first immersion tank housed in the at least one of the storage levels, the first moving platform being movable relative to the frame; and
    a second moving platform supporting the second immersion tank housed in the at least one of the storage levels, the second moving platform being movable relative to the frame,
    the first and second moving platforms being operatively connected to each other such that the first and second moving platforms are movable synchronously to translate the first and second immersion tanks between the storage and access positions.

4. The immersion tank storage system of claim 1, wherein the means for synchronously moving the first and second immersion tanks comprises:
    an actuator; and
    at least one rotary member operatively connected to the actuator and rotatable thereby,
    wherein rotation of the at least one rotary member by the actuator causes displacement of the first and second immersion tanks between the storage and access positions.

5. The immersion tank storage system of claim 4, wherein the actuator is a motor.

6. The immersion tank storage system of claim 4, wherein each of the at least one rotary member is a lead screw.

7. The immersion tank storage system of claim 4, wherein the at least one rotary member includes two rotary members laterally spaced apart from one another, the two rotary members being operatively connected to the actuator by a flexible link.

8. The immersion tank storage system of claim 4, wherein the means for synchronously moving the first and second immersion tanks further comprises:
    a first moving platform supporting the first immersion tank housed in the at least one of the storage levels; and
    a second moving platform supporting the second immersion tank housed in the at least one of the storage levels,
    the first and second moving platforms being operatively connected to each other by the at least one rotary member, the first and second moving platforms being movable synchronously by the at least one rotary member to translate the first and second immersion tanks between the storage and access positions.

9. The immersion tank storage system of claim 1, wherein:
    the first and second immersion tanks are offset from one another in a depth direction of the frame;
    the first and second immersion tanks housed in the at least one of the storage levels are moved along the depth direction from the storage position to the access position; and
    in the access position, the first and second immersion tanks are disposed, in the depth direction, at least partially outwardly from opposite ends of the frame along the depth direction.

10. The immersion tank storage system of claim 9, wherein the means for synchronously moving the first and second immersion tanks comprises:
    a first retractable support and a second retractable support for supporting the first and second immersion tanks housed in the at least one of the storage levels when the first and second immersion tanks are moved to the access position,
    the first and second retractable supports being operatively connected to the frame and movable between a retracted position and a deployed position, the first and second retractable supports extending further from the frame along the depth direction in the deployed position than in the retracted position in order to support the first and second immersion tanks respectively in the access position.

11. The immersion tank storage system of claim 1, wherein each of the immersion tanks weighs between 500 and 3500 kg.

12. A method for storing and accessing immersion tanks in a data center, comprising:
    providing a frame defining a plurality of storage levels disposed above one another;

providing a plurality of immersion tanks supported by the frame, each storage level housing a first immersion tank and a second immersion tank;

synchronously moving the first and second immersion tanks housed in at least one of the storage levels between a storage position and an access position, in the storage position, the first and second immersion tanks being spaced from each other by a first distance (D1); and in the access position, the first and second immersion tanks being spaced from each other by a second distance (D2) greater than the first distance (D1), wherein in the access position, the first and second immersion tanks are accessible by an operator for accessing the electronic devices contained therein.

13. The method of claim 12, wherein synchronously moving the first and second immersion tanks comprises maintaining the first and second immersion tanks generally symmetrical to each other relative to a fixed vertical plane extending therebetween throughout a range of motion between the storage position and the access position.

14. The method of claim 12, wherein synchronously moving the first and second immersion tanks comprises actuating an actuator to cause the first and second immersion tanks to move between the storage and access positions.

15. The method of claim 12, wherein synchronously moving the first and second immersion tanks comprises deploying first and second retractable supports for supporting the first and second immersion tanks housed in the at least one of the storage levels when the first and second immersion tanks are moved to the access position.

* * * * *